United States Patent
Yamada

(10) Patent No.: US 9,652,881 B2
(45) Date of Patent: May 16, 2017

(54) IMAGE PROCESSING DEVICE AND IMAGE PROCESSING METHOD

(71) Applicant: Panasonic Corporation, Osaka (JP)

(72) Inventor: Hitoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 14/371,865

(22) PCT Filed: Oct. 2, 2013

(86) PCT No.: PCT/JP2013/005869
§ 371 (c)(1),
(2) Date: Jul. 11, 2014

(87) PCT Pub. No.: WO2014/076868
PCT Pub. Date: May 22, 2014

(65) Prior Publication Data
US 2014/0362078 A1     Dec. 11, 2014

(30) Foreign Application Priority Data

Nov. 19, 2012  (JP) .................................. 2012-253614

(51) Int. Cl.
*G06T 15/00*     (2011.01)
*H04N 13/00*     (2006.01)
*H04N 13/02*     (2006.01)

(52) U.S. Cl.
CPC ......... *G06T 15/00* (2013.01); *H04N 13/0011* (2013.01); *H04N 13/0014* (2013.01); *H04N 13/026* (2013.01); *H04N 13/0271* (2013.01)

(58) Field of Classification Search
CPC .... G03H 1/08; G03H 2001/0816; G06K 9/80; G06K 2209/40; G06T 2200/04;
(Continued)

(56) References Cited

U.S. PATENT DOCUMENTS

2010/0201783 A1* 8/2010 Ueda .................. G02B 27/2228
                                                              348/46
2011/0080463 A1   4/2011 Endo et al.
(Continued)

FOREIGN PATENT DOCUMENTS

CN       102547356      7/2012
JP       9-102945       4/1997
(Continued)

OTHER PUBLICATIONS

International Search Report issued Dec. 24, 2013 in corresponding International Application No. PCT/JP2013/005869.
(Continued)

*Primary Examiner* — Gregory J Tryder
*Assistant Examiner* — Kwang Lee
(74) *Attorney, Agent, or Firm* — Wenderoth, Lind & Ponack, L.L.P.

(57) ABSTRACT

An image processing device includes: a data obtainment unit which obtains an input image captured from a first viewpoint, and depth information indicating a depth of a subject in the input image; a viewpoint transformation unit which generates, using the depth information, a plurality of first transformed images each of which is an image of the input image seen from a corresponding one of second viewpoints different from the first viewpoint; and a blank area analysis unit that analyzes a blank area which is included in each of the first transformed images and includes a pixel which does not have a corresponding pixel in the input image, and generate blank information which indicates, for each of the second viewpoints, a size of the blank area in the first transformed image corresponding to the second viewpoint.

10 Claims, 17 Drawing Sheets

(58) Field of Classification Search
CPC ... G06T 15/205; G06T 15/00; H04N 13/0022; H04N 13/0011; H04N 13/0014; H04N 13/026
USPC .......................................................... 345/419
See application file for complete search history.

(56) References Cited

U.S. PATENT DOCUMENTS

| | | | |
|---|---|---|---|
| 2012/0033872 A1* | 2/2012 | Cho | G06T 15/205 382/154 |
| 2012/0105435 A1* | 5/2012 | Chen | G06T 15/205 345/419 |
| 2012/0163701 A1 | 6/2012 | Gomi | |
| 2013/0063576 A1 | 3/2013 | Okubo et al. | |

FOREIGN PATENT DOCUMENTS

| | | |
|---|---|---|
| JP | 2002-290964 | 10/2002 |
| JP | 2010-250452 | 11/2010 |
| JP | 2011-199382 | 10/2011 |
| WO | 2012/147329 | 11/2012 |

OTHER PUBLICATIONS

Office Action issued Apr. 1, 2016 in corresponding Chinese Application No. 201380004345.8 (with partial English translation).

* cited by examiner

FIG. 7
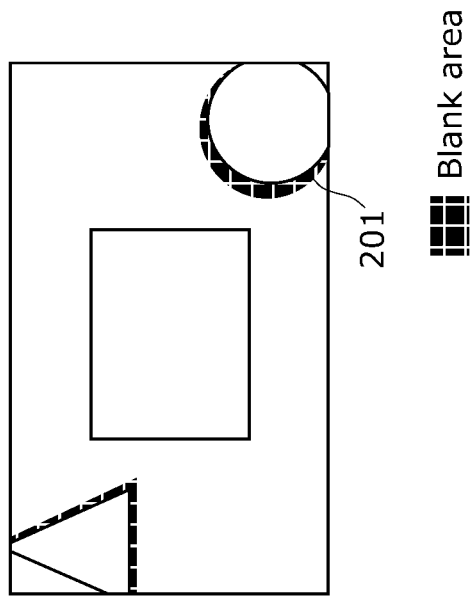
(a) Projective coordinate system
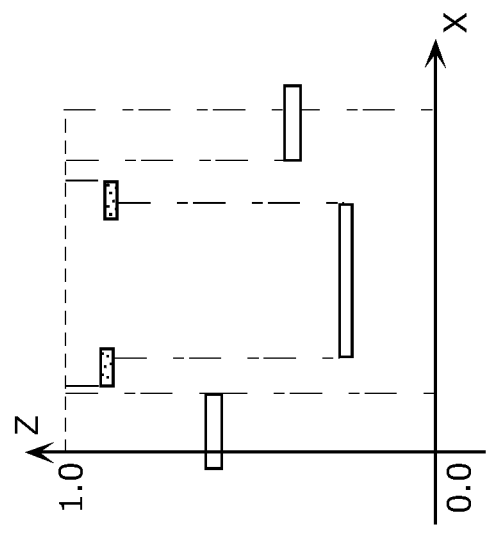
(b) Screen coordinate system

IMAGE PROCESSING DEVICE AND IMAGE PROCESSING METHOD

TECHNICAL FIELD

The present invention relates to image processing devices and image processing methods, and particularly relates to an image processing device which generates, using depth information indicating a depth of a subject in an input image captured from a first viewpoint, images of the input image seen from a plurality of second viewpoints different from the first viewpoint.

BACKGROUND ART

In recent years, editing of an image captured with an image capturing device has become more common. For example, when the user designates a partial area of an image via a graphical user interface (GUI), an image of a subject in the partial area is, for example, magnified (see patent literature (PTL) 1, for example).

Here, a normal zoom function magnifies or reduces the image of the subject according to a magnification factor. However, an image obtained as if it is taken with a camera at close range from the subject cannot be obtained. There is a method for obtaining an effect as if the camera is at close range of the subject, which is exemplified in PTL 2. According to PTL 2, a three-dimensional model is generated by combining a plurality of input images obtained by capturing a subject from a plurality of directions. A projective transformation from an arbitrary viewpoint position is performed on the generated three-dimensional model, which generates the subject image. With such a method, it is possible to obtain an image of the subject as if it is taken with the camera at close range from the subject, or as if it is taken from a direction different from an actual direction of the camera.

CITATION LIST

Patent Literature

[PTL 1]
  Japanese Unexamined Patent Application Publication No. H09-102945
[PTL 2]
  Japanese Unexamined Patent Application Publication No. 2002-290964

SUMMARY OF INVENTION

Technical Problem

In such a device, there is a demand for improvement in image quality of an image which is displayed after a viewpoint change.

In view of this, the present invention has as an object to provide an image processing device that can improve image quality of an image which is displayed after the viewpoint change.

Solution to Problem

An image processing device according to an aspect of the present invention includes: a data obtainment unit configured to obtain an input image captured from a first viewpoint, and depth information indicating a depth of a subject in the input image; a viewpoint transformation unit configured to generate, using the depth information, a plurality of first transformed images each of which is an image of the input image seen from a corresponding one of second viewpoints different from the first viewpoint; and a blank area analysis unit configured to analyze a blank area which is included in each of the first transformed images and includes a pixel which does not have a corresponding pixel in the input image, and generate blank information which indicates, for each of the second viewpoints, a size of the blank area in the first transformed image corresponding to the second viewpoint.

Note that, the general or specific aspect may be implemented using a system, a method, an integrated circuit, a computer program, or a computer-readable recording medium, such as a CD-ROM, or any combination of systems, methods, integrated circuits, computer programs, or computer-readable recording media.

Advantageous Effects of Invention

The present invention can provide an image processing device which can improve image quality of an image displayed after a viewpoint change.

BRIEF DESCRIPTION OF DRAWINGS

FIG. 7 shows diagrams for describing the viewpoint-transformation process according to Embodiment 1.

DESCRIPTION OF EMBODIMENTS

Figure 1:
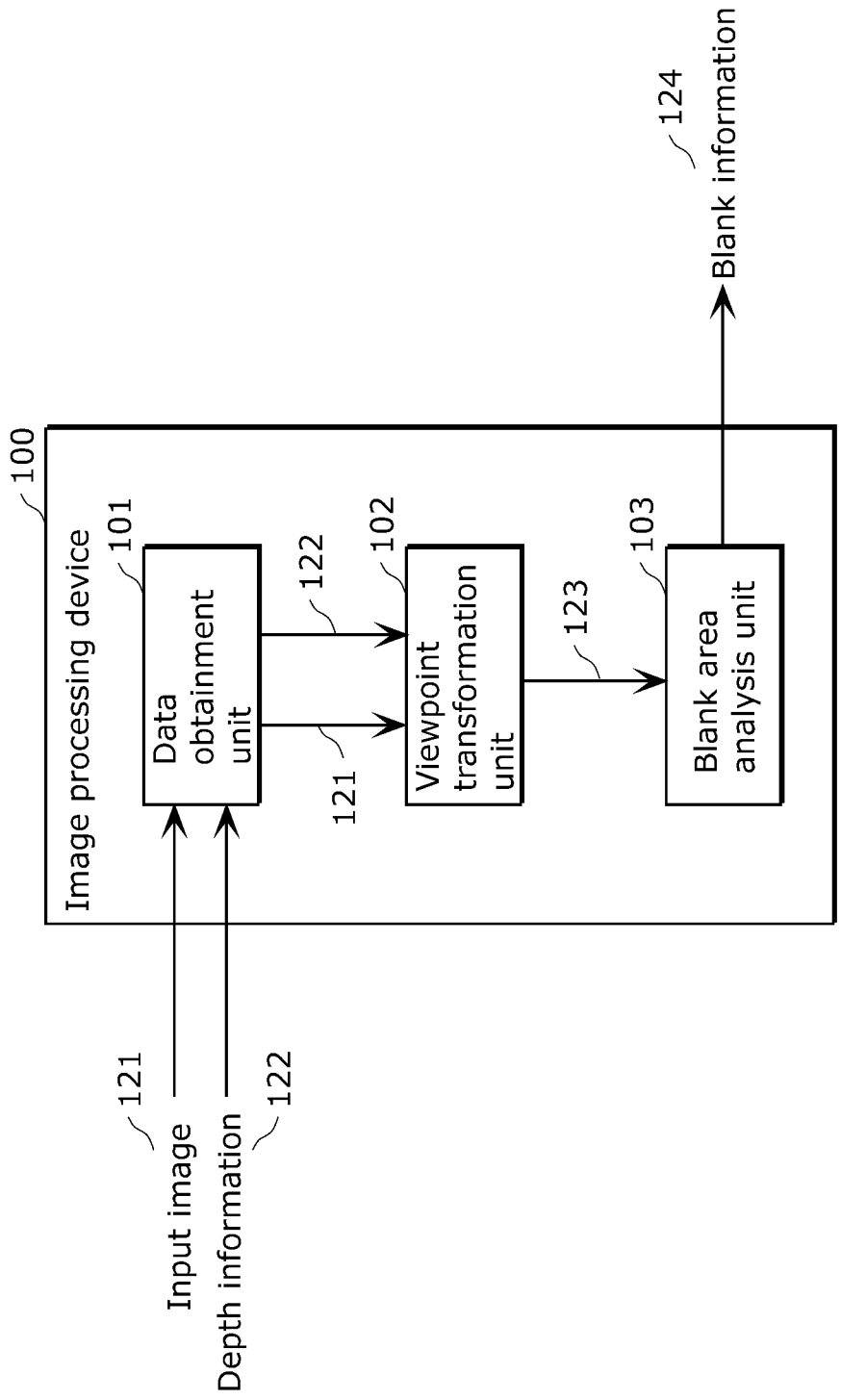
FIG. 1 is a block diagram of an image processing device according to Embodiment 1.

Underlying Knowledge Forming Basis of the Present Invention

The inventor of the present invention found that a problem described below occurs with a conventional technique.

With a method in PTL 2, image quality of a transformed image sometimes greatly deteriorates. For example, in the transformed image generated by the projective transformation, a blank area is sometimes created which corresponds to no image in an input image. Generally, a small number of large blank areas exert a larger effect on deterioration of image quality than a large number of dispersed small blank areas. Thus, the inventor of the present invention found that the image quality of a transformed image greatly deteriorates when a large blank area is generated. Furthermore, whether or not an area including such a large blank area exists in the image cannot be seen in advance until an image is actually transformed.

A case is considered in which this viewpoint-transformation method is used and a user controls a viewpoint-transformed image using a GUI. In this case, the inventor of the present invention found that a transformed image having a deteriorated image quality is displayed depending on an area designated by the user because the user cannot obtain information in advance regarding designation, that is, which area results in an image with what extent of blank areas.

An image processing device according to an aspect of the present invention includes: a data obtainment unit configured to obtain an input image captured from a first viewpoint, and depth information indicating a depth of a subject in the input image; a viewpoint transformation unit configured to generate, using the depth information, a plurality of first transformed images each of which is an image of the input image seen from a corresponding one of second viewpoints different from the first viewpoint; and a blank area analysis unit configured to analyze a blank area which is included in each of the first transformed images and includes a pixel which does not have a corresponding pixel in the input image, and generate blank information which indicates, for each of the second viewpoints, a size of the blank area in the first transformed image corresponding to the second viewpoint.

With this configuration, the image processing device generates blank information which indicates, for each of the second viewpoints, a size of the blank area in the first transformed image corresponding to the second viewpoint. With this, the image processing device can prevent a user from selecting a transformed image having low quality including a large blank area, for example, by presenting the user with the blank information. Alternatively, the image processing device can, using the blank information, reduce chances that a transformed image having low quality is displayed. As above, the image processing device can improve image quality of an image which is displayed after a viewpoint change.

For example, the image processing device may further include: a map generation unit configured to associate each of the second viewpoints with a corresponding one of two-dimensional positions, and generate, using the blank information, a blank map which shows, for each of the two-dimensional positions, information regarding the blank area in the second viewpoint associated with the two-dimensional position; and a display unit configured to display the blank map.

With this configuration, the image processing device can prevent the user from selecting a transformed image having low quality including a large blank area.

For example, it may be that the display unit is further configured to display the input image, and each of positions on the input image is associated with a corresponding one of the second viewpoints, the image processing device further comprising a viewpoint selection unit configured to select a selection viewpoint which is one of the second viewpoints which is associated with one of the positions on the input image, which is specified by a user, wherein when the selection viewpoint is selected by the viewpoint selection unit, the display unit is configured to switch a displayed image from the input image to one of the first transformed images which corresponds to the selection viewpoint, each of the two-dimensional positions are associated with a corresponding one of the positions on the input image, and the display unit is configured to display the blank map when displaying the input image.

With this configuration, the image processing device can display, in association with a viewpoint-change operation by the user, information regarding the blank area in an image resulting from the viewpoint-change operation. With this, the user can intuitively recognize the information regarding the blank area resulting from the viewpoint-change operation.

For example, the map generation unit may be configured to generate the blank map which shows, in association with each of the positions on the input image, a size of the blank area included in one of the first transformed images which corresponds to the second viewpoint associated with the associated position on the input image.

With this configuration, the image processing device can display, in association with the viewpoint-change operation by the user, a size of the blank area in an image resulting from the viewpoint-change operation. With this, the user can intuitively recognize the size of the blank area resulting from the viewpoint-change operation.

For example, it may be that the viewpoint transformation unit is further configured to generate, using the depth information, for each of the second viewpoints, a plurality of second transformed images each of which is an image of the input image seen from a corresponding one of third viewpoints each of which is at a position obtained by shifting, in a direction perpendicular to a plane of the input image, a corresponding one of the second viewpoints, the blank area analysis unit is further configured to determine whether or not a size of the blank area included in each of the second transformed images is smaller than or equal to a predetermined threshold, and the blank map shows, in association with each of the positions on the input image, a third viewpoint which has the blank area of a size smaller than or equal to the predetermined threshold, among the third viewpoints corresponding to the one of the second viewpoints which is associated with the associated position on the input image.

With this configuration, the image processing device can display, in association with a viewpoint-change operation by the user, a degree of a zoom operation (movement of a viewpoint in the direction perpendicular to a plane of the input image) that can be performed on the viewpoint after the change. With this, the user can intuitively recognize the degree of the zoom operation that can be performed after the viewpoint-change operation.

For example, it may be that the image processing device further includes: a display unit configured to display the input image; and a viewpoint selection unit configured to (i) determine one or more of the first transformed images having the blank areas of sizes smaller than or equal to a predetermined threshold by using the blank information, and (ii) select, as a selection image, one of the one or more of the first transformed images, wherein the display unit is configured to switch a displayed image from the input image to the selection image.

With this configuration, the image processing device can reduce chances of displaying a transformed image having low quality.

For example, it may be that the image processing device further includes: a display unit configured to display the input image; a viewpoint selection unit configured to select one of the second viewpoints as a selection viewpoint; and a route selection unit configured to (i) determine, from among two or more of the first transformed images corresponding to two or more of the second viewpoints which are positioned between the first viewpoint and the selection viewpoint, one or more of the first transformed images having the blank areas of sizes smaller than or equal to a predetermined threshold by using the blank information, and (ii) select, as an intermediate viewpoint image, a first transformed image among the one or more of the first transformed images, wherein when the selection viewpoint is selected by the viewpoint selection unit, the display unit is configured to switch between and display the input image, the intermediate viewpoint image, and one of the first transformed images corresponding to the selection viewpoint in this order to sequentially change a viewpoint of a displayed image from the first viewpoint to the selection viewpoint.

With this configuration, the image processing device can reduce chances of displaying an image having low quality at the time of the viewpoint-change operation.

For example, the map generation unit may be configured to: divide the second viewpoints into a plurality of groups each including different ones of the second viewpoints; associate each of the groups with a corresponding one of the two-dimensional positions; calculate, for each of the two-dimensional positions, a degree of a size of the blank area in the group associated with the two-dimensional position, using sizes of the blank areas in the second viewpoints included in the group, the sizes of the blank areas being indicated by the blank information; and, generate the blank map which shows, in association with each of the two-dimensional positions, a degree of a size of the blank area in the group associated with the associated two-dimensional position.

With this configuration, the image processing device can reduce an erroneous action, such as the case where the user selects a location different from a location where the user wants to operate upon, that occurs during an operation.

For example, the viewpoint transformation unit may be configured to: generate a three-dimensional model of the subject in a camera coordinate system, using the input image, the depth information, and a camera parameter when the input image is captured; and generate the first transformed images by performing, on the three-dimensional model, projective transformations using transformation parameters each corresponding to a different one of the second viewpoints.

Furthermore, an image processing method according to an aspect of the present invention includes: obtaining an input image captured from a first viewpoint, and depth information indicating a depth of a subject in the input image; generating, using the depth information, a plurality of first transformed images each of which is an image of the input image seen from a corresponding one of second viewpoints different from the first viewpoint; and analyzing a blank area which is included in each of the first transformed images and includes a pixel which does not have a corresponding pixel in the input image, and generating blank information which indicates, for each of the second viewpoints, a size of the blank area in the first transformed image corresponding to the second viewpoint.

With this configuration, the image processing method generates blank information indicating, for each of the second viewpoints, a size of the blank area included in the first transformed image corresponding to the second viewpoint. With this, the image processing method can prevent a user from selecting a transformed image having low quality including a large blank area, for example, by presenting the user with the blank information. Alternatively, the image processing method can, using the blank information, reduce chances of displaying a transformed image having low quality. As above, the image processing method can improve image quality of an image which is displayed after a viewpoint change.

Note that, the general or specific aspect may be implemented using a system, a method, an integrated circuit, a computer program, or a computer-readable recording medium such as a CD-ROM, or any combination of systems, methods, integrated circuits, computer programs, or computer-readable recording media.

The following specifically describes embodiments with reference to the drawings.

Note that, each of embodiments described below shows a general or specific example. The numerical values, shapes, materials, structural elements, the arrangement and connection of the structural elements, steps, the processing order of the steps, and so forth described in embodiments below are mere examples, and therefore do not limit the present invention. Among the structural elements in the following embodiments, structural elements not recited in the independent claims which define the broadest concept are described as arbitrary structural elements.

Embodiment 1

An image processing device according to this embodiment generates a blank map which indicates, for each of viewpoints, a size of a blank area in a transformed image resulting from a viewpoint change, and presents a user with the blank map. With this, the image processing device can prevent the user from selecting a transformed image having low quality including a large blank area.

First, an outline configuration and operation of the image processing device according to this embodiment are described.

FIG. 1 is a block diagram showing an outline configuration of an image processing device 100 according to this embodiment.

The image processing device 100 shown in FIG. 1 generates blank information 124 by using an input image 121 and depth information 122. The input image 121 is an image which captures a subject from a first viewpoint. The depth information 122 indicates the depth of the subject in the input image 121.

The image processing device 100 includes a data obtainment unit 101, a viewpoint transformation unit 102, and a blank area analysis unit 103.

The data obtainment unit 101 obtains the input image 121 and the depth information 122.

The viewpoint transformation unit 102 generates, using the depth information 122, transformed images 123 each of which is an image of the input image 121 seen from a corresponding one of second viewpoints different from the first viewpoint.

The blank area analysis unit 103 analyzes a blank area included in each of the transformed images 123. Here, the blank area is an area for which a corresponding pixel does not exist in the input image 121. Furthermore, the blank area analysis unit 103 generates the blank information 124. The blank information 124 indicates, for each of the second viewpoints, a size of a blank area in the transformed image 123 corresponding to the second viewpoint.

Figure 2:
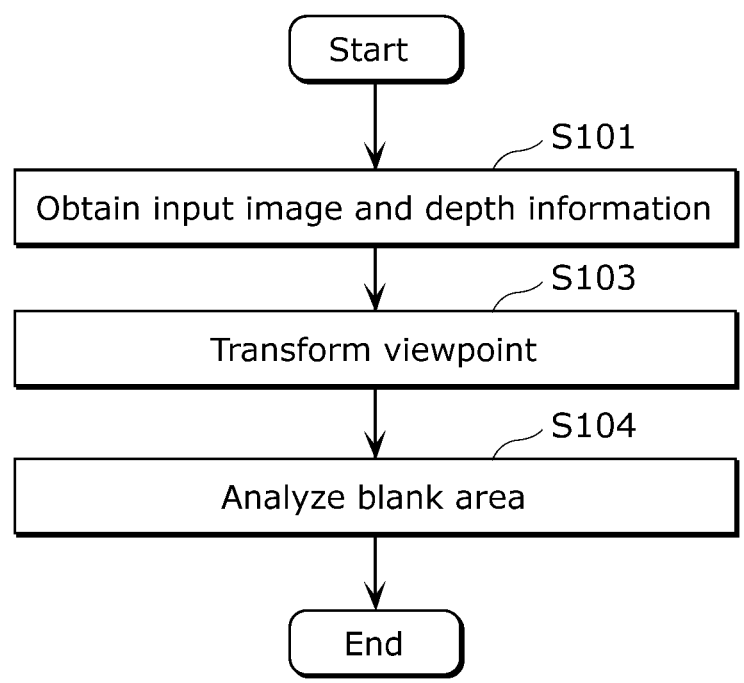
FIG. 2 is a flowchart of an image processing method according to Embodiment 1.

FIG. 2 is a flowchart of an image processing method performed by the image processing device 100.

First, the data obtainment unit 101 obtains the input image 121 and the depth information 122 (S101). Next, the viewpoint transformation unit 102 generates, using the input image 121 and the depth information 122, the transformed images 123 (S103). Next, the blank area analysis unit 103 analyzes a blank area included in each of the transformed images 123, and generates the blank information 124 (S104).

The following describes a detailed configuration of the image processing device 100.

Figure 3:
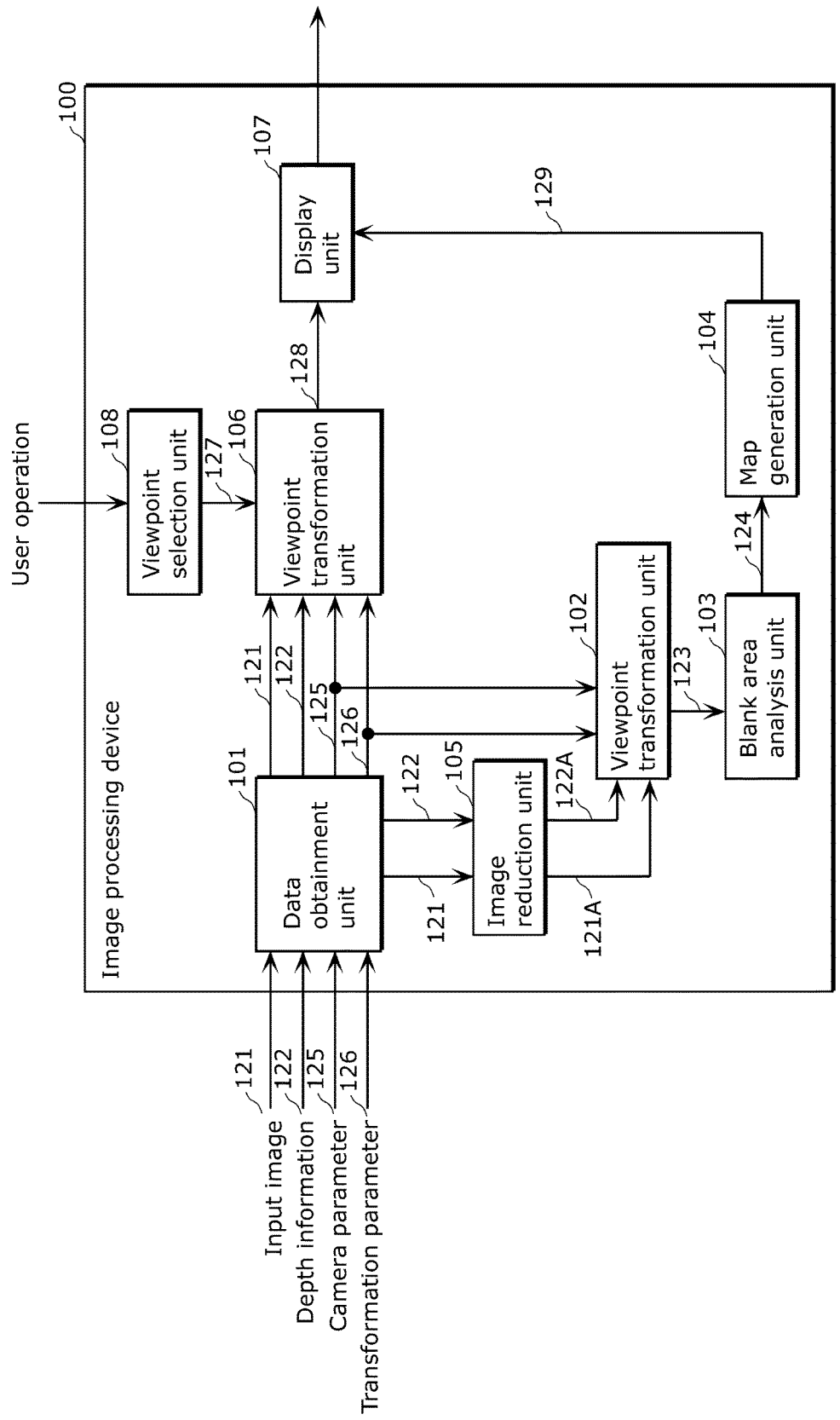
FIG. 3 is a block diagram of the image processing device according to Embodiment 1.

FIG. 3 is a block diagram showing a configuration of the image processing device 100 according to this embodiment.

The image processing device 100 shown in FIG. 3 is, for example, included in a digital still camera or a digital video camera. Note that, the image processing device 100 can be applied to various devices including a function of displaying a still image. For example, the image processing device 100 can also be applied to a personal computer, a smartphone, or the like.

The image processing device 100 displays the input image 121 that is a still image, and display a transformed image 128 which is an image obtained by changing the viewpoint of the input image 121 according to a viewpoint-change instruction input by a user. Furthermore, the image processing device 100 generates a blank map 129 indicating sizes of blank areas in the viewpoint positions, and displays the blank map 129 on the input image 121.

The image processing device 100 includes: the data obtainment unit 101; the viewpoint transformation unit 102; the blank area analysis unit 103; a map generation unit 104; an image reduction unit 105, a viewpoint transformation unit 106; and a display unit 107.

The data obtainment unit 101 obtains the input image 121, the depth information 122, a camera parameter 125, and a plurality of transformation parameters 126.

The depth information 122 is data which indicates a distance from a camera that captured the input image 121 to the subject in the input image 121. For example, the depth information 122 is a depth map indicating a depth of each of pixels included in the input image 121. Note that, the depth information 122 may be input from outside the image processing device 100 or may be generated by the image processing device 100. For example, the image processing device 100 may generate the depth information 122 using a plurality of images each of which captures the same subject with a different focal position.

The camera parameter 125 is a parameter indicating a capturing condition of the input image 121. More specifically, the camera parameter 125 includes information regarding an angle of view at the time of capturing an image, a front end distance of the depth, and a rear end distance of the depth.

Each of the transformation parameters 126 is a parameter regarding a projective transformation of a three-dimensional model. Note that, the transformation parameter 126 need not necessarily be an instruction for changing a viewpoint position. For example, the transformation parameter 126 may be information indicating a type of projective transformation (e.g., a perspective projection, an orthogonal projection, or the like) or information indicating an angle of view. Note that, the data obtainment unit 101 may obtain the camera parameter 125 and the transformation parameters 126 from outside the image processing device 100. Alternatively, the camera parameter 125 and the transformation parameters 126 may be retained in the image processing device 100.

The image reduction unit 105 generates an input image 121A and depth information 122A by reducing sizes of images of the input image 121 and the depth information 122. It is preferable that the sizes of the input image 121A and the depth information 122A be smaller than or equal to a size of an image displayed on the display unit 107, but are not limited thereto. Furthermore, the image processing device 100 need not necessarily include the image reduction unit 105, but the input image 121 and the depth information 122 may be inputted to the viewpoint transformation unit 102 as they are. In this case, the input image 121A and the depth information 122A in a process described later may be replaced with the input image 121 and the depth information 122, respectively. Furthermore, when the images are not reduced, the viewpoint transformation unit 102 and the viewpoint transformation unit 106 which will be described later can be realized by a single processing unit. Furthermore, analysis may be performed with an original image size up to the operation performed by the blank area analysis unit 103, and the blank information 124 that results from the analysis may be reduced.

The viewpoint transformation unit 102 generates a three-dimensional model of the subject in a camera coordinate system, using the input image 121A, the depth information 122A, and the camera parameter 125. Next, the viewpoint transformation unit 102 generates the transformed image 123 by performing a projective transformation on the three-dimensional model using the transformation parameter 126. Furthermore, the projective transformation is performed using each of the transformation parameters, resulting in generation of a plurality of transformed images 123, in other words, the transformed images 123 are images of the input image 121 seen from different viewpoints.

The blank area analysis unit 103 generates the blank information 124 by analyzing a blank area included in each of the transformed images 123.

The map generation unit 104 generates, using the blank information 124 generated by the blank area analysis unit 103, the blank map 129 to be displayed. The blank map 129 two dimensionally shows information regarding the blank area. More specifically, each of the second viewpoints is associated with a corresponding one of two-dimensional positions. Furthermore, the blank map 129 is information regarding the blank areas in the second viewpoints each of which is associated with a corresponding one of the two-dimensional positions. Furthermore, each of the two-dimensional positions is associated with a corresponding one of positions on the input image 121. Note that, a format for displaying the blank map 129 is not limited to the above. For example, the blank map 129 may three dimensionally show information regarding the blank areas.

A viewpoint selection unit 108 selects, as the selection viewpoint 127, a viewpoint position designated by a user operation. More specifically, each of the positions on the input image 121 is associated with a corresponding one of the second viewpoints. Then, the viewpoint selection unit 108 selects, as the selection viewpoint, one of the second viewpoints which is associated with one of the positions on the input image 121, which is specified by a user. Note that, the viewpoint selection unit 108 may receive an instruction from the user to change the viewpoint position with respect to the input image 121, as the transformation parameter 126. In this case, the transformation parameter 126 is sent to the viewpoint transformation unit 106. Then, the viewpoint transformation unit 106 performs a viewpoint-transformation process using the transformation parameter 126.

The viewpoint transformation unit 106 generates a three-dimensional model of the subject, using the input image 121, the depth information 122, and the camera parameter 125. Next, the viewpoint transformation unit 106 generates the transformed image 128 by performing, on the three-dimensional model, a projective transformation using the transformation parameter 126 which corresponds to the selection viewpoint 127. In other words, the transformed image 128 is an image of the input image 121 seen from the selection viewpoint 127.

The display unit 107 displays the input image 121. Furthermore, when the selection viewpoint 127 is selected by the viewpoint selection unit 108, the display unit 107 switches a displayed image from the input image 121 to the transformed image 128. Furthermore, when displaying the input image 121, the display unit 107 displays the blank map 129 on the input image 121.

Note that, the display unit 107 may display the blank map 129 around the input image 121. Furthermore, the blank map 129 may be displayed without overlapping with the input image 121 at all or may be displayed partially overlapping with the input image 121. Furthermore, the display unit 107 may display a reduced image of the input image 121 around the input image 121, and display the blank map 129 on the reduced image.

For example, the display unit 107 displays these images on a display included in the image processing device 100 or on an external display (e.g., a display of a camera which includes the image processing device 100).

Figure 4:
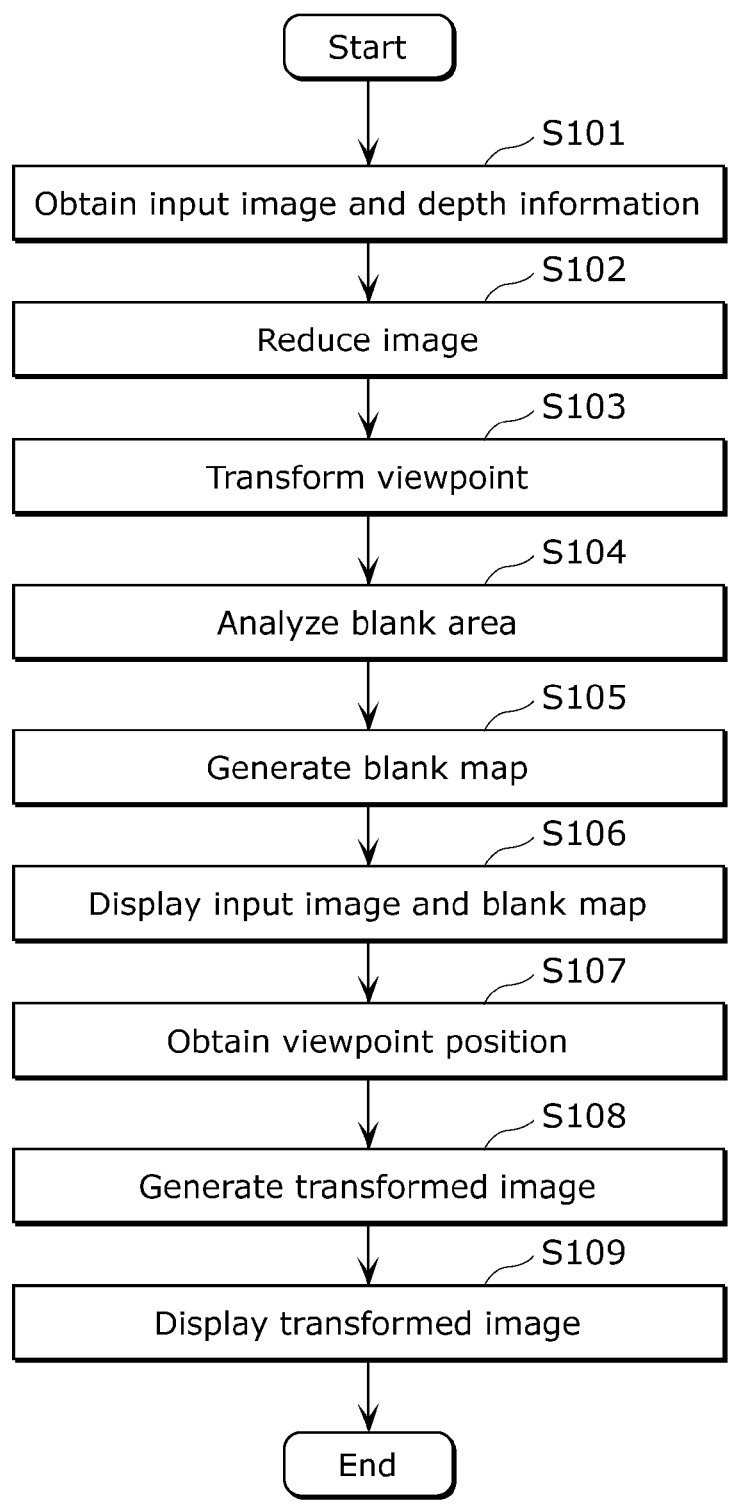
FIG. 4 is a flowchart of the image processing method according to Embodiment 1.

Next, a flow of an image processing method performed by the image processing device 100 according to this embodiment is described using FIG. 4. FIG. 4 is a flowchart of the image processing method according to this embodiment.

First, the data obtainment unit 101 obtains the input image 121 as input data, the depth information 122, the camera parameter 125, and the transformation parameter 126 (S101). Next, where necessary, the image reduction unit 105 generates the input image 121A and the depth information 122A by reducing the input image 121 and the depth information 122 (S102). Next, the viewpoint transformation unit 102 generates a plurality of the transformed images 123 using the input image 121A and the depth information 122A (S103). Next, the blank area analysis unit 103 generates the blank information 124 by analyzing a size of the blank area included in each of the transformed images 123 (S104). Next, the map generation unit 104 generates the blank map 129 using the blank information 124 (S105).

Next, the display unit 107 displays the input image 121 and the blank map 129 on a GUI (S106). In this state, the user can, for example, select an arbitrary position on the input image 121, and a viewpoint position change destination is thus instructed. The viewpoint selection unit 108 obtains, as the selection viewpoint 127, the viewpoint position designated by the user (S107). Next, the viewpoint selection unit 108 generates the transformed image 128 which shows the input image 121 from the selection viewpoint 127 (S108). Lastly, the display unit 107 displays the generated transformed image 128 (109).

Note that, as described above, the process (S102) may be skipped in which the input image 121 and the depth information 122 are reduced. In this case, generation of the transformed image 128 in step S108 may be skipped, and the display unit 107 may display, in step S109, the transformed image 123 generated in step S103. Alternatively, in step S108, the viewpoint transformation unit 106 may generate the transformed image 128 by performing, on the transformed image 123 generated in step S103, a predetermined process (e.g., a process in which a blank area is complemented).

Figure 5:
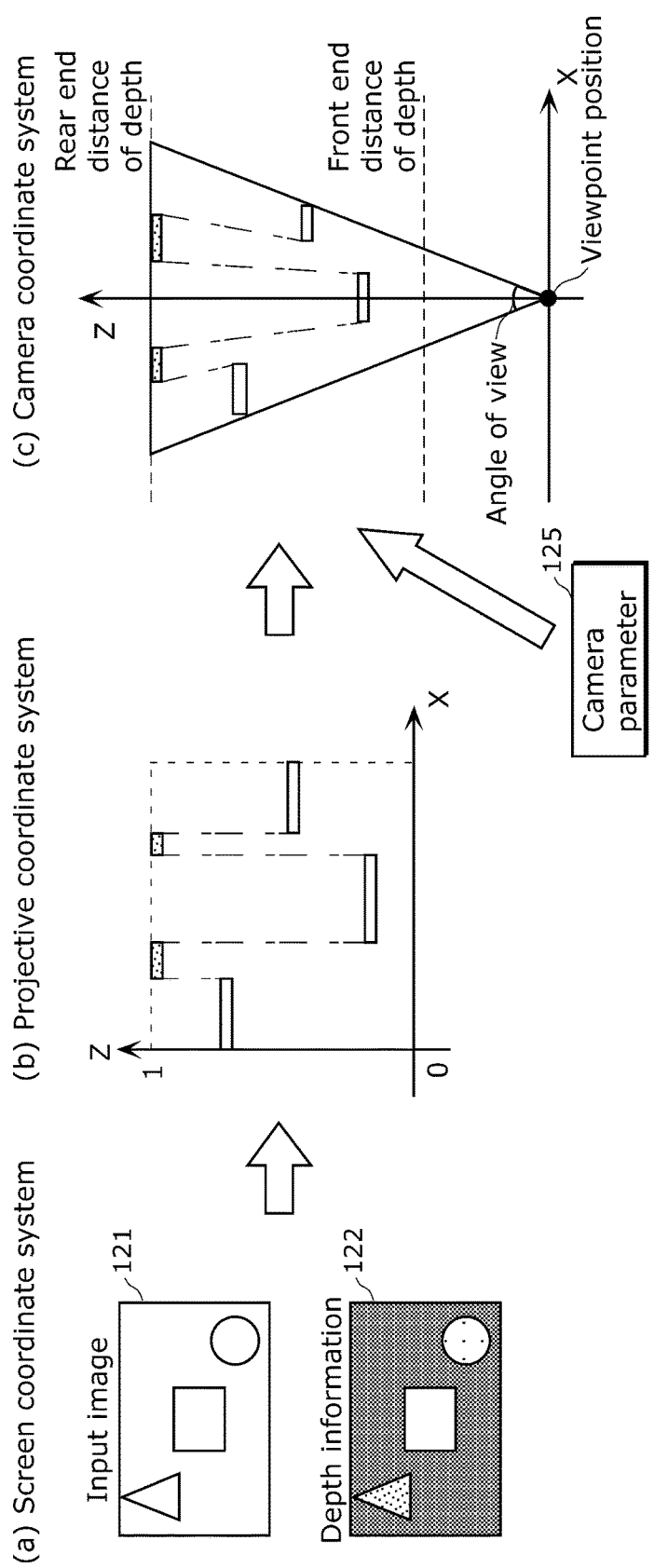
FIG. 5 shows diagrams for describing a viewpoint-transformation process according to Embodiment 1.
Figure 6:
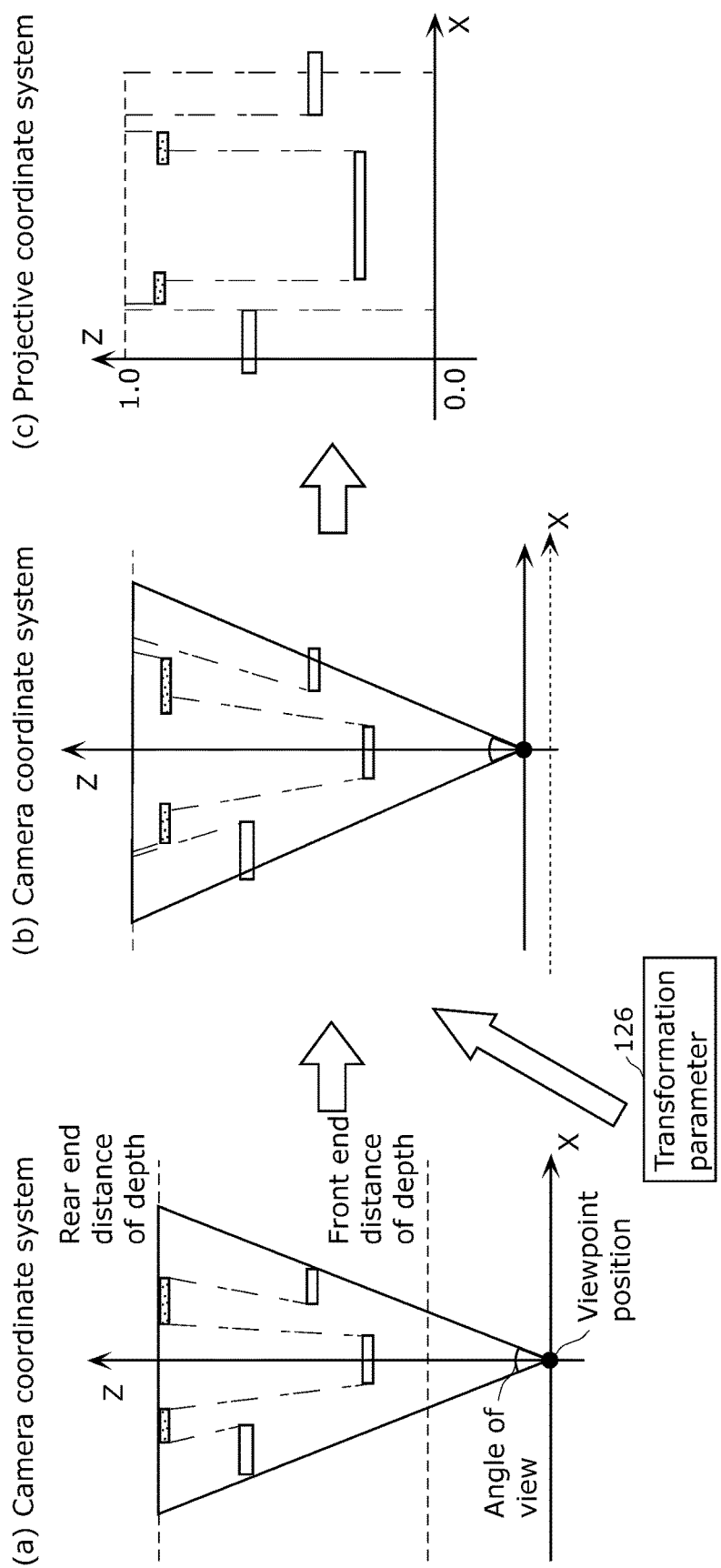
FIG. 6 shows diagrams for describing the viewpoint-transformation process according to Embodiment 1.

The following describes in detail a process (S103 in FIG. 4) of generating the transformed image 123, with reference to FIG. 5 to FIG. 7. Here, description is given on the case where the viewpoint position is changed in a zoom direction (a direction perpendicular to the plane of the input image). In FIGS. 5 to 7, an X-axis direction and a Y-axis direction indicate a horizontal direction and a perpendicular direction (directions parallel to the plane of the input image), and a Z-axis direction indicates a depth direction.

First, as shown in FIG. 5, using the input image 121 and the depth information 122 represented in a screen coordinate system ((a) in FIG. 5), the viewpoint transformation unit 102 generates a three-dimensional model represented in a projective coordinate system ((b) in FIG. 5). That is, using the input image 121 and the depth information 122, the viewpoint transformation unit 102 calculates, for each pixel, a vector Vp(x,y,z) indicating a pixel position in the projective coordinate system. The screen coordinate system is a two-dimensional coordinate system corresponding to a display screen. The projective coordinate system is also referred to as a clip coordinate system or a device coordinate system, and is a three-dimensional coordinate system obtained by performing a projective transformation on a camera coordinate system. The camera coordinate system is also referred to as a view coordinate system, and is a three-dimensional coordinate system defined based on a viewpoint (camera) position and a line-of-sight direction. In this embodiment, in the camera coordinate system, the viewpoint position corresponds to an origin, and the line-of-sight direction corresponds to the Z-axis direction (depth direction).

Subsequently, using the camera parameter 125, the viewpoint transformation unit 102 transforms the three-dimensional model from the projective coordinate system to the camera coordinate system ((c) in FIG. 5). More specifically, using expressions (1) to (3) below, the viewpoint transformation unit 102 transforms the vector Vp indicating the position of each pixel in the projective coordinate system into a vector Vc indicating the position of each pixel in the camera coordinate system. In the expressions (1) to (3) below, the vectors Vp and Vc are expressed in homogeneous coordinates.

[Math. 1]

$$Vc=[x'/w' \, y'/w' \, z'/w' \, 1] \qquad (1)$$

Here, x', y', z', and w' are calculated according to the expression (2) below.

[Math. 2]

$$[x' \, y' \, z' \, w']=Vp \times Mpc=[xyz1] \times Mpc \qquad (2)$$

A matrix Mpc is an inverse matrix of a projection matrix Mcp. Using a front end distance zn of the depth, a rear end distance zf of the depth, an angle of view fovY, and an aspect ratio Aspect, the projection matrix Mcp is expressed as the expression (3) below.

[Math. 3]

$$Mcp = \begin{bmatrix} \frac{\cot\left(\frac{fovY}{2}\right)}{Aspect} & 0 & 0 & 0 \\ 0 & \cot\left(\frac{fovY}{2}\right) & 0 & 0 \\ 0 & 0 & \frac{zf}{zf-zn} & 1 \\ 0 & 0 & -zn*\frac{zf}{zf-zn} & 0 \end{bmatrix} \quad (3)$$

Next, as shown in FIG. 6, the viewpoint transformation unit 102 changes the viewpoint position of the three-dimensional model in the camera coordinate system in response to the instruction to change the viewpoint position ((a) and (b) in FIG. 6). More specifically, the viewpoint transformation unit 102 moves the vector Vc indicating the position of each pixel in the camera coordinate system in a reverse direction to the moving direction of the viewpoint position, thereby calculating a vector Vc' indicating the position of each pixel in the camera coordinate system after a change in the viewpoint position. Subsequently, the viewpoint transformation unit 102 transforms the three-dimensional model having the changed viewpoint position from the camera coordinate system to the projective coordinate system ((c) in FIG. 6). Specifically, the viewpoint transformation unit 102 transforms the vector Vc' which indicates the position of each pixel in the camera coordinate system after a change in the viewpoint position to a vector Vp' which indicates the position of each pixel in the projective coordinate system. That is, the viewpoint transformation unit 102 performs projective transformation indicated by an expression (4) below to calculate the vector Vp'.

[Math. 4]

$$Vp' = Vc' \times Mcp \quad (4)$$

In this embodiment, the projection matrix Mcp expressed by the expression (4) is the same as the projection matrix Mcp expressed by the expression (3). The projection matrix Mcp used herein does not necessarily need to be such projection matrix. The projection matrix may be, for example, an orthogonal projection matrix or a projection matrix with rotation or inversion. That is, in the case where the transformation parameter 126 includes information indicating the projection matrix, the projection matrix indicated by the transformation parameter 126 may be used. Finally, as shown in FIG. 7, the viewpoint transformation unit 102 generates the transformed image 123 expressed in the screen coordinate system from the three-dimensional model expressed in the projective coordinate system ((a) and (b) in FIG. 7).

As described above, the viewpoint transformation unit 102 generates the transformed images 123.

Note that, the viewpoint transformation unit 106 also generates the transformed image 128 with processes similar to the processes described above. Note that, the viewpoint transformation unit 106 may perform, in addition to the above-described processes, a process in which pixels of the blank area of the generated transformed image are complemented.

Here, as shown in (b) in FIG. 7, a blank area 201 exists in the transformed image 123. The blank area 201 is a group of blank pixels which do not have corresponding pixels in the input image 121. The blank pixel can be interpolated for example by a method in which pixel values of pixels adjacent to the blank area 201 are used or the like. However, when the blank pixels are large, even when interpolated, the interpolated portion stands out, leading to deterioration of the image quality of the transformed image 123. Generally, a small number of the blank areas 201 which are large in size exert a greater effect on deterioration of the image quality than a large number of blank areas 201 which are small in size and dispersed. Thus, when the blank area 201 of large size is generated, the image quality of the transformed image 123 greatly deteriorates. Thus, the blank area analysis unit 103 analyzes whether or not a blank area 201 of large size exists in the transformed image 123 using a blank value (e.g., the number of pixels) indicating the size of the blank area 201.

Here, the change in viewpoint position includes a change in the viewpoint position in the Z-axis direction (direction perpendicular to the plane of the image) and a change in the viewpoint position in the X-axis direction and the Y-axis direction (directions parallel to the plane of the image). In the following, changing the viewpoint position in the Z-axis direction is particularly referred to as a zoom-factor change. Furthermore, increase in the zoom factor means that the viewpoint position is at a closer range from the subject. Furthermore, the viewpoint position in the X-axis direction and the Y-axis direction (X and Y coordinates of the viewpoint position) is also referred to as a plane viewpoint position.

Figure 8:
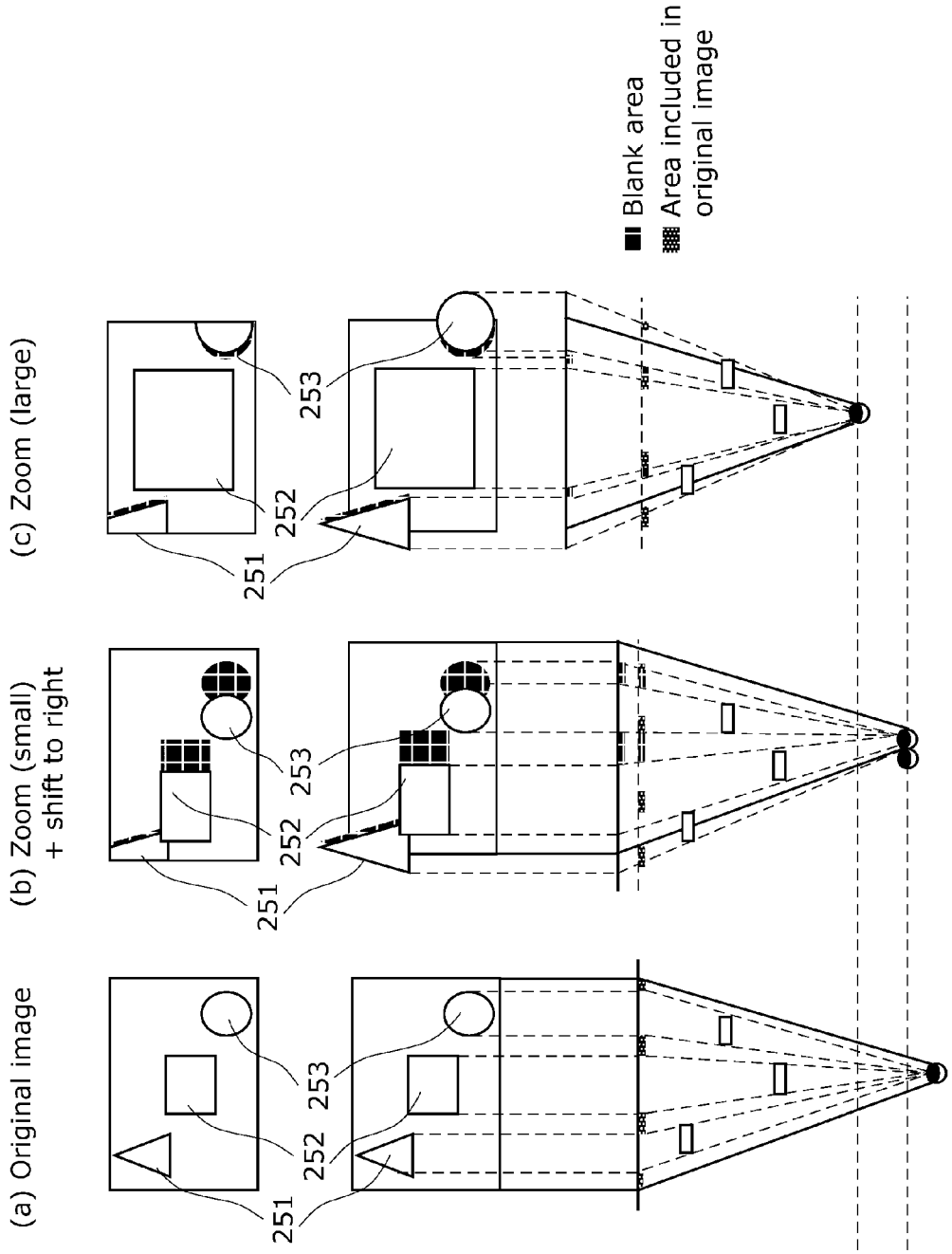
FIG. 8 shows diagrams showing examples of blank areas resulting from the viewpoint transformation according to Embodiment 1.

The size of the blank area 201 does not simply increase with an increase in the zoom factor, but changes according to the zoom factor and a plane viewpoint position at the time. An example of this is shown in FIG. 8. (a) in FIG. 8 shows an original image before a zoom-factor change. The original image includes three subjects 251 to 253. Furthermore, among the subjects 251 to 253, the subject 252 is positioned nearest, and the subject 251 is positioned farthest, and the subject 253 is positioned therebetween.

(c) in FIG. 8 shows a transformed image when a zoom factor is increased while maintaining the same plane viewpoint position as the plane viewpoint position in (a) in FIG. 8. Due to the increase in the zoom factor, the position of the subject 252 further approaches the viewpoint position. With this, while the subject 252 is shown in larger size, blank areas begin to appear on the other subjects 251 and 253.

(b) in FIG. 8 shows the transformed image of the case where the plane viewpoint position is moved to the right, and the zoom factor is increased from the state shown in (a) in FIG. 8. Note that, the zoom factor in (b) in FIG. 8 is smaller than the zoom factor in (c) in FIG. 8. The viewpoint position is shifted to the right from the viewpoint position of (a) in FIG. 8, and thus a right side of the subject in (a) in FIG. 8 should be shown. However, a right side of the subject does not exist in the original image. Thus, a large blank area is generated. Although (b) in FIG. 8 is of a smaller zoom factor compared to (c) in FIG. 8, a large blank area is generated due to shifting of the plane viewpoint position. As described, the size of the blank area is affected both by the zoom factor and the plane viewpoint position. Therefore, the blank area analysis unit 103 examines the size of the blank area of the case where both the zoom factor and the plane viewpoint position are changed.

Figure 9:
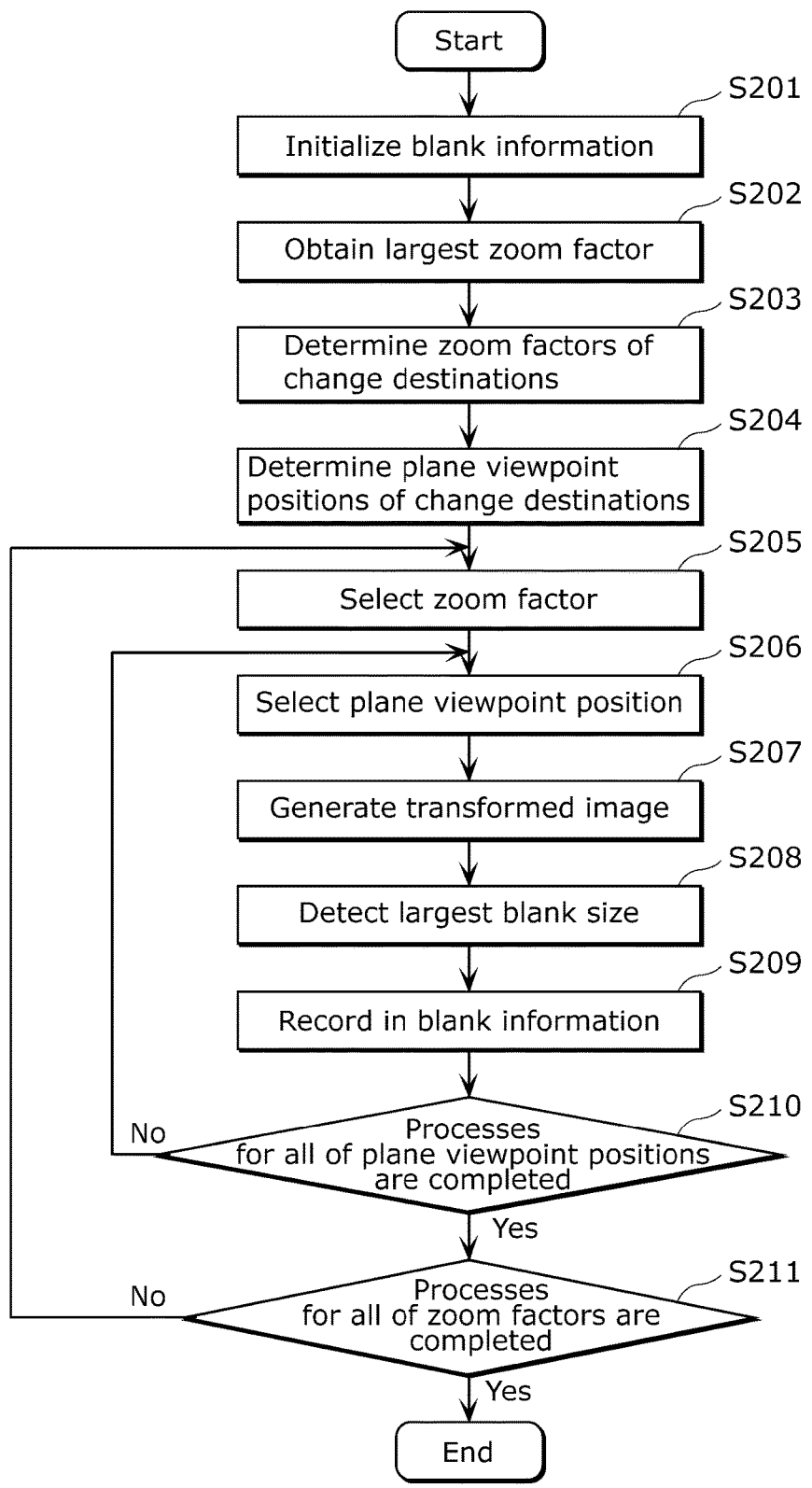
FIG. 9 is a flowchart of a process for analyzing a blank area according to Embodiment 1.

FIG. 9 is a flowchart showing a process for generating the blank information 124 (S103 and S104 in FIG. 4). Description of operations for the process is given according to this flowchart.

First, the blank area analysis unit 103 initializes the blank information (S201). Next, the viewpoint transformation unit 102 obtains a value of a predetermined largest zoom factor (S202), and determines, using the obtained largest zoom factor, zoom factors of change destinations (S203). For example, the viewpoint transformation unit 102 determines a step size of the zoom factor. For example, the viewpoint transformation unit 102 determines the step size to be 0.1, when the largest zoom factor is 1.4 times. Note that, the method for determining the zoom factors of the change destinations, the largest zoom factor, and the step size is not limited to the above, but the determination may be made with an arbitrary method. Furthermore, at least one of (i) the zoom factors of the change destinations, (ii) the largest zoom factor, and (iii) the step size may be predetermined.

Next, the viewpoint transformation unit 102 determines plane viewpoint positions of change destinations (S204). For example, the viewpoint transformation unit 102 determines, for each of the up-down direction and the right-left direction, an upper limit value and a step size of the plane viewpoint position of the change destination. Note that, the method for determining the plane viewpoint positions of the change destinations, the upper limit values, and the step sizes is not limited to the above, but the determination may be made according to an arbitrary method. Furthermore, at least one of (i) the plane viewpoint positions of the change destinations, (ii) the upper limit values, and (iii) the step sizes may be specified in advance.

Next, the viewpoint transformation unit 102 selects one of the zoom factors determined in step S203 (S205). Furthermore, the viewpoint transformation unit 102 selects one of the plane viewpoint positions determined in step S204 (S206).

Next, the viewpoint transformation unit 102 generates the transformed image 123 which is of the zoom factor selected in S205 and is an image of the input image 121 seen from the plane viewpoint position selected in step S206 (S207).

Next, the blank area analysis unit 103 detects the blank areas included in the entire transformed image 123 generated in step S207, and examines the size of the blank area which is the largest among the detected blank areas (a blank size) (S208). The size of the blank area may be the number of pixels of the consecutive blank areas or the number of pixels of the blank area included in a unit area.

Next, the blank area analysis unit 103 records, in the blank information 124, the detected blank size in association with the selected viewpoint position (S209).

When the processes for all of the plane viewpoint positions set in step S204 is yet to be completed (No in S210), the viewpoint transformation unit 102 selects a plane viewpoint position in which a search is performed next (S206), and repeat the process of step S207 and the subsequent processes. In other words, a size of a blank area is analyzed for each of the plane viewpoint positions which are set in step S204.

When the processes for all of the plane viewpoint positions are completed (Yes in S210), and the processes for all of the zoom factors which are set in step S203 are yet to be completed (No in S211), the viewpoint transformation unit 102 selects the zoom factor at which the search is performed next (S205), and repeat the process of step S206 and the subsequent processes. In other words, the size of the blank area is analyzed for each of combinations of (i) the zoom factors which are set in step S203 and (ii) the plane viewpoint positions which are set in step S204.

When the processes for all of the zoom factors are completed (Yes in S211), the processes end.

With the above processes, the blank size of each of the combinations of the plane viewpoint positions and the zoom factors is recorded in the blank information 124. Hypothetically, when the plane viewpoint position is changed by 10 steps in the perpendicular direction and by 10 steps in the horizontal direction, and the zoom factor is changed by 5 steps, the blank information 124 is generated indicating the blank size at the viewpoint position of 10×10×5.

As above, using the depth information 122, the viewpoint transformation unit 102 (i) generates the transformed images 123 (first transformed images) each of which is an image of the input image 121 seen from a corresponding one of the second viewpoints different from the first viewpoint, and (ii) generates, for each of the second viewpoints, the transformed images 123 (second transformed images) each of which is an image of the input image 121 seen from a corresponding one of third viewpoints each of which is at a position obtained by shifting, in the direction perpendicular to the plane of the input image, a corresponding one of the second viewpoints. Then, the blank area analysis unit 103 analyzes a blank size in each of the transformed images 123 (the first transformed images and the second transformed images).

Note that, although an example here describes that the zoom factor and the plane viewpoint position are changed in a uniform step size, the step size need not be uniform. Furthermore, although both the zoom factor and the plane viewpoint position are changed in the above-described description, only either one may be changed. Furthermore, although the viewpoint positions of the change destinations are defined by the zoom factors and the plane viewpoint positions in the above description, arbitrary viewpoint positions in a three-dimensional space may be used as viewpoint positions of the change destinations.

Furthermore, the order of the processes described above is an example, and the blank information 124 may be generated with a method other than the method described above. For example, although the transformed image 123 is generated for each of the viewpoint positions and the blank size in the transformed image 123 is analyzed in the above description, a plurality of the transformed images 123 corresponding to a plurality of viewpoint positions may be generated, and then the blank sizes of the transformed images 123 may be analyzed.

The map generation unit 104 generates, using the blank information 124 generated by the blank area analysis unit 103, the blank map 129 that is displayed by the display unit 107. More specifically, the map generation unit 104 generates the blank map 129 which indicates a degree of the size of the blank area.

Figure 10:
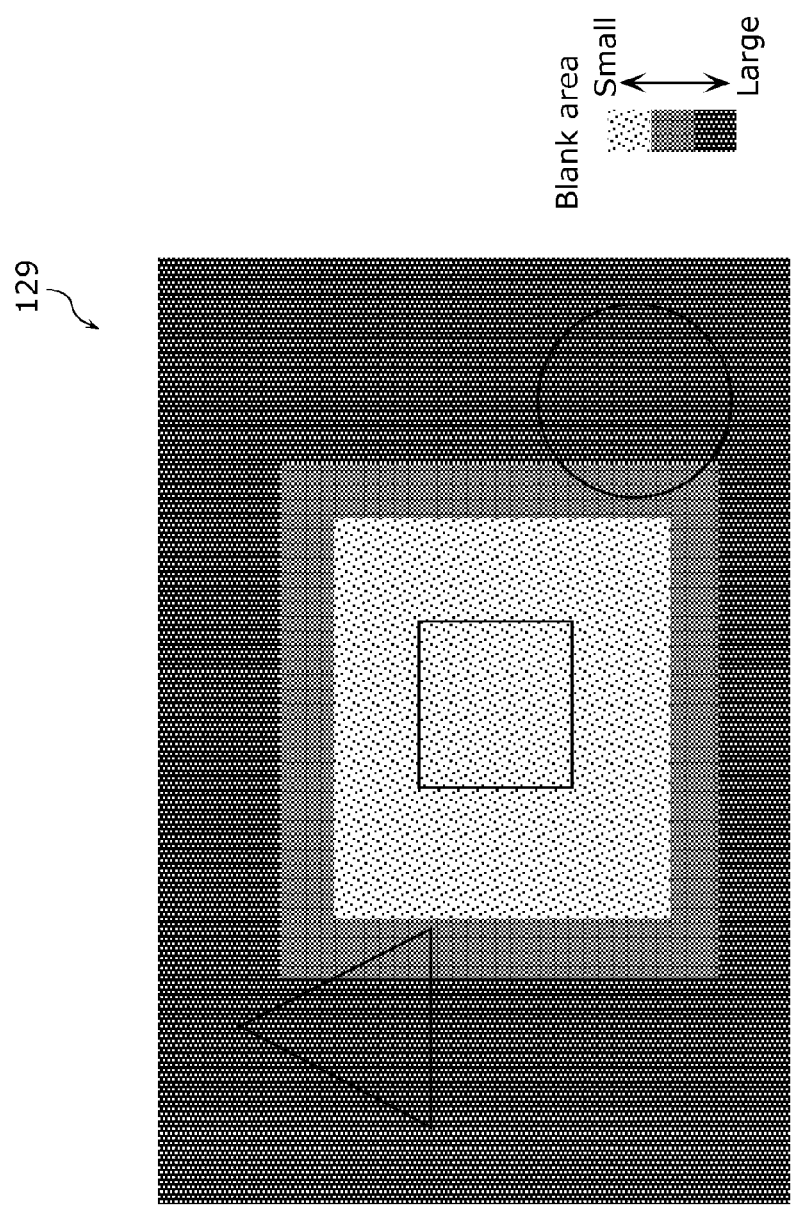
FIG. 10 is a diagram showing an example of a blank map according to Embodiment 1.

FIG. 10 is a diagram showing an example of the blank map 129. As shown in FIG. 10, each of the plane viewpoint positions is associated with a corresponding one of positions on a GUI screen (on the input image 121). For example, the center position of the GUI screen is associated with an original viewpoint position without a change in a plane viewpoint position. Furthermore, an edge of the GUI screen is associated with an upper limit value or a lower limit value of the plane viewpoint position. More specifically, a position on the right side in the GUI screen is associated with a viewpoint position for seeing the input image 121 from a right side. In a similar manner, the left side, the upper side, and the lower side of the GUI screen are associated with the viewpoint positions which are for seeing the input image 121 from the left side, the upper side, and the lower side, respectively. In addition, a change in the viewpoint is smaller at a position on the GUI screen closer to the central area of the GUI screen, and a change in the viewpoint is greater at a position on the GUI screen closer to the edge of the GUI screen.

Furthermore, the viewpoint positions may be associated with an input operation on the GUI screen performed by the user. For example, when the user selects an arbitrary position on the input image 121, the viewpoint position changes to a viewpoint position which corresponds to the arbitrary position. For example, when a position on a right side in the input image 121 is selected, the transformed image 128 is displayed which is the input image 121 seen from a right side. In this case, the position specified by a user operation and the viewpoint position in the above-described blank map 129 may be associated. In other words, when a position is selected which is indicated as having a small blank size by the blank map 129, the transformed image 128 having a small blank size is displayed.

Here, for example, the viewpoint position associated with a position on the GUI screen is a plane viewpoint position. Furthermore, information indicating the blank size in each of the plane viewpoint positions is a largest blank size obtained by changing the zoom factor in a corresponding one of the viewpoint positions. Note that, the information indicating the largest blank size may be an actual value of the blank size indicated by the blank information 124 or information in which the value of the blank size indicated by the blank information 124 is classified into one of levels as shown in FIG. 10. In an example shown in FIG. 10, the largest blank size is classified into three levels, and a three-value mask is generated as the blank map 129.

Furthermore, information indicating the blank size in each of the plane viewpoint positions may be information which is obtained from a plurality of blank sizes obtained by changing the zoom factor in a corresponding one of the plane viewpoint positions. For example, the information may be an average value of blank sizes or a blank size at a designated zoom factor.

In other words, the map generation unit 104 generates the blank map 129 which shows, in association with each of the positions on the input image 121, a size of the blank area included in one of the transformed images 123 which corresponds to the second viewpoint associated with the associated position on the input image.

Furthermore, when pixels having different blank sizes are finely distributed, the map generation unit 104 may average blank sizes of an area (e.g., area of 16×16 pixels, or the like) larger than a unit of the blank size in the blank information 124, and may generate a mask on the basis of the area. More specifically, the map generation unit 104 divides the second viewpoints into a plurality of groups each including different ones of the second viewpoints, and associates each of the groups with a corresponding one of the two-dimensional positions. Then, the map generation unit 104 calculates, for each of the two-dimensional positions, a degree of a size of the blank area in the group associated with the two-dimensional position, using sizes of the blank areas in the second viewpoints included in the group. The sizes of the blank areas are indicated by the blank information 124. Next, the map generation unit 104 generates the blank map 129 which two-dimensionally shows, in association with each of the two-dimensional positions, a degree of a size of the blank area in the group associated with the associated two-dimensional position. With this, it is possible to reduce an erroneous action, such as the case where the user touches a location different from a location where the user wants to operate upon, that occurs during an operation.

The display unit 107 displays, on a user interface, such as a GUI, the blank map 129 generated by the map generation unit 104.

As above, the image processing device 100 displays information regarding a size of the blank area, before the user specifies a viewpoint position. With this, the user can know in advance the degree of image quality of the transformed image. Note that, when the blank map 129 which indicates the degree of the blank area for each plane viewpoint position is displayed, the image processing device 100 displays, for example, a transformed image which is at a zoom factor specified in advance and corresponds to a plane viewpoint position specified by the user.

Figure 11:
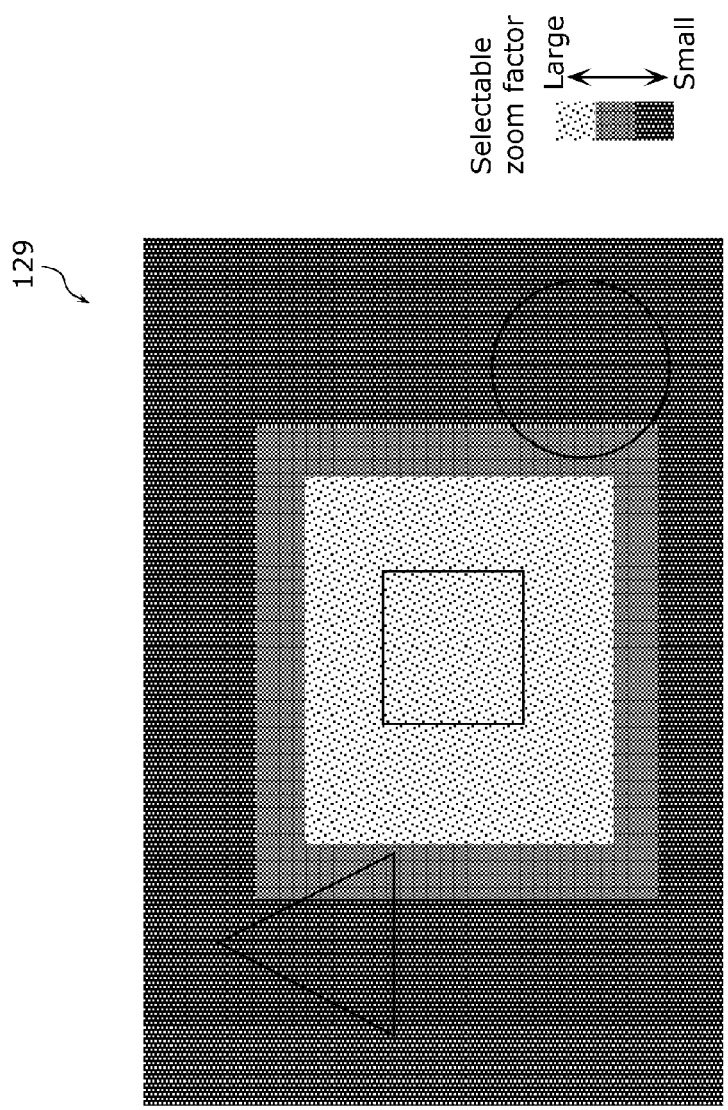
FIG. 11 is a diagram showing another example of the blank map according to Embodiment 1.

Furthermore, the blank map 129 may indicate a degree of selectable zoom factor for each plane viewpoint position. FIG. 11 is a diagram showing another example of the blank map 129. In the blank map 129 shown in FIG. 11, plane viewpoint positions are associated with positions on the GUI screen, in a similar manner as the blank map 129 shown in FIG. 10. Furthermore, in association with each of the plane viewpoint positions, a degree of a zoom factor is indicated which can be selected when the viewpoint is changed to the associated plane viewpoint position. Here, the selectable zoom factor is, among the zoom factors, a zoom factor at which the blank size is less than a predetermined threshold.

In this case, using a plurality of blank sizes obtained when a zoom factor is changed in each of the viewpoint positions, the map generation unit 104 detects a largest zoom factor at a corresponding one of the viewpoint positions. Here, the largest zoom factor is a zoom factor which indicates that, when a zoom factor is smaller than or equal to the largest zoom factor, a blank area having a size exceeding a threshold is not included in the transformed image. The map generation unit 104 generates the blank map 129 by obtaining the largest zoom factor in each viewpoint position, in other words, the blank area analysis unit 103 determines whether or not the size of the blank area included in each of the transformed images 123 is smaller than or equal to a predetermined threshold. The blank map 129 shows, in association with each of the positions on the input image 121, a third viewpoint which has the blank area of a size smaller than or equal to the predetermined threshold, among the third viewpoints corresponding to the one of the second viewpoints which is associated with the associated position on the input image 121.

Furthermore, in a similar manner as the case of FIG. 10, FIG. 11 shows the largest zoom factor in three levels. In this case, the transformed image is displayed which is at the largest zoom factor of the displayed three levels and corresponds to the plane viewpoint position specified by a user. For example, 1.4 times is selected as the zoom factor when the largest zoom factor is "large", 1.2 times is selected as the zoom factor when the largest zoom factor is middle, and 1.0 time is selected as the zoom factor when the largest zoom factor is "small".

With the above, the image processing device 100 according to this embodiment generates the blank information 124 which indicates, for each of the second viewpoints, a size of the blank area in the transformed image 123 corresponding to the second viewpoint. Then, the image processing device 100 generates the blank map 129 using the blank information 124, and displays the blank map 129 on the input image 121.

With this, the image processing device 100 can prevent the user from selecting the transformed image 128 having low quality including a large blank area. As above, the image processing device 100 can improve image quality of the image which is displayed after the viewpoint change.

Note that, in the above description, when a viewpoint-change destination is specified, the image processing device 100 displays the transformed image 128 corresponding to the viewpoint-change destination. However, the image processing device 100 may sequentially switch between and display transformed images 128 to change the viewpoints sequentially from the original viewpoint position to the viewpoint-change destination.

Embodiment 2

In the above-described Embodiment 1, a case of changing a viewpoint position in accordance with a user instruction is described. An image processing device 100A according to this embodiment automatically determines a viewpoint position of a change destination using blank information 124 which is generated by the image processing device 100A.

Figure 12:
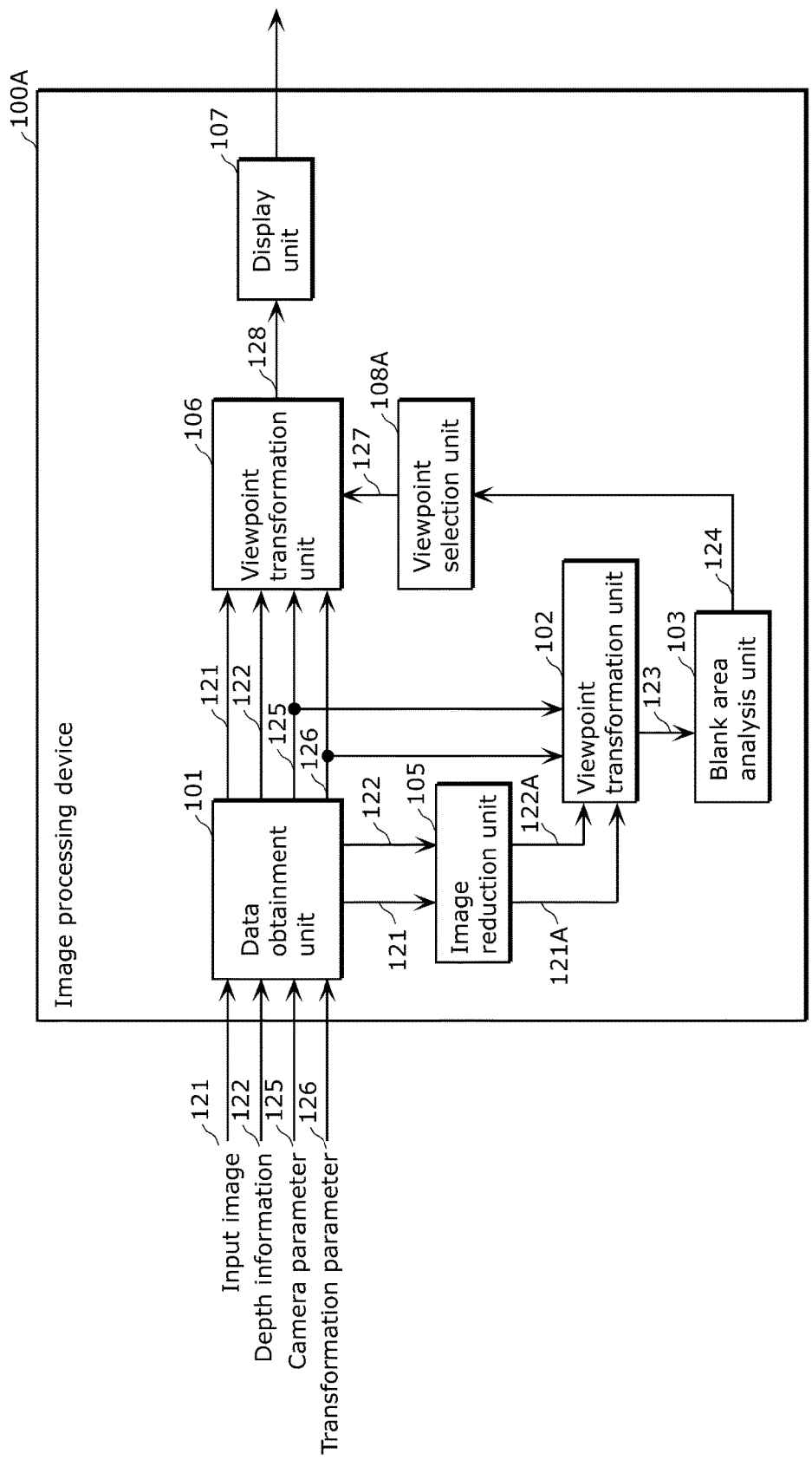
FIG. 12 is a block diagram of an image processing device according to Embodiment 2.

The following describes the image processing device 100A according to this embodiment, with reference to FIG. 12. In the following, structural elements similar to the structural elements in FIG. 3 are denoted with the same reference signs and descriptions thereof are omitted to give descriptions only on different structural elements.

Compared to an image processing device 100 shown in FIG. 3, the image processing device 100A according to this embodiment includes a viewpoint selection unit 108A instead of a viewpoint selection unit 108 and a map generation unit 104.

The image processing device 100A displays, for example, when a predetermined time passes from the displaying of the input image 121, a transformed image 128 of a changed viewpoint position.

The viewpoint selection unit 108A selects a selection viewpoint 127 which is a viewpoint position of a viewpoint-change destination, using the blank information 124 generated by the blank area analysis unit 103. For example, the viewpoint selection unit 108A selects a viewpoint position in which a blank size is smaller than a predetermined threshold. Note that, the viewpoint selection unit 108A may select a viewpoint position in which the blank size is the smallest at a specific zoom factor. Here, the specific zoom factor is, for example, a predetermined zoom factor or a zoom factor specified by a user operation.

In other words, the viewpoint selection unit 108 (i) determines one or more of transformed images 123 having the blank areas of sizes smaller than or equal to a predetermined threshold by using the blank information 124, and (ii) selects, as a selection image, one of the one or more of the transformed images 123.

Note that, the image processing device 100A may further include the viewpoint selection unit 108 and the map generation unit 104 shown in FIG. 3. In this case, the image processing device 100A may change a viewpoint when a user input is not made for a predetermined period following the displaying of the blank map 129.

Figure 13:
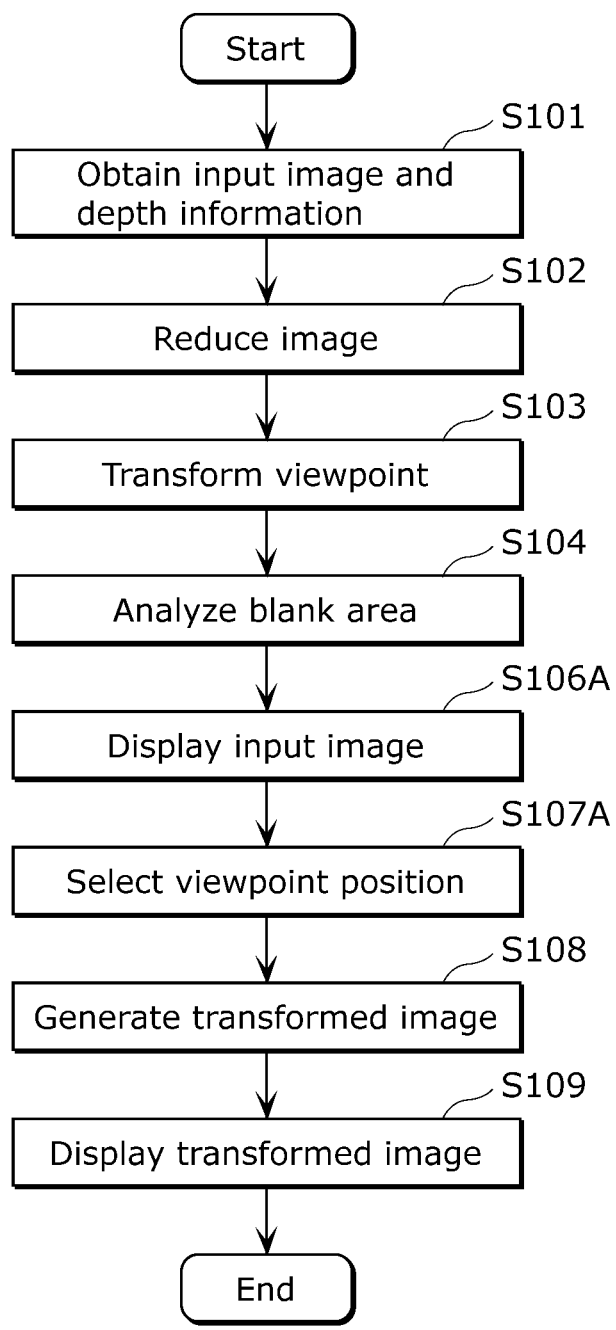
FIG. 13 is a flowchart of an image processing method according to Embodiment 2.

FIG. 13 is a flowchart of an image processing method performed by the image processing device 100A. The processes shown in FIG. 13 include, instead of steps S105 to S107 shown in FIG. 4, steps S106A and S107A.

After the blank information 124 is generated in step S104, a display unit 107 displays the input image 121 (S106A). Next, the viewpoint selection unit 108 selects the selection viewpoint 127 using the blank information 124 (S107A). The subsequent processes are similar to the processes in FIG. 4.

Note that, the timing when the input image 121 is displayed is not limited to the above, but may be an arbitrary timing any time before displaying the transformed image 128 (S109).

With the above, the image processing device 100A according to this embodiment can prevent the case where the transformed image 128 having low quality with a large blank size is displayed.

Embodiment 3

An image processing device 100B according to this embodiment sequentially changes viewpoint positions from an original viewpoint position to a viewpoint position of a change destination, when changing a viewpoint. Furthermore, the image processing device 100B selects, using blank information 124, a route for a viewpoint change along which an image having a large blank size is not displayed.

The image processing device 100B according to this embodiment is described with reference to FIG. 14. In the following, structural elements similar to structural elements in FIG. 3 or FIG. 12 are denoted with the same reference signs, and descriptions thereof are omitted to give descriptions only on different structural elements.

Figure 14:
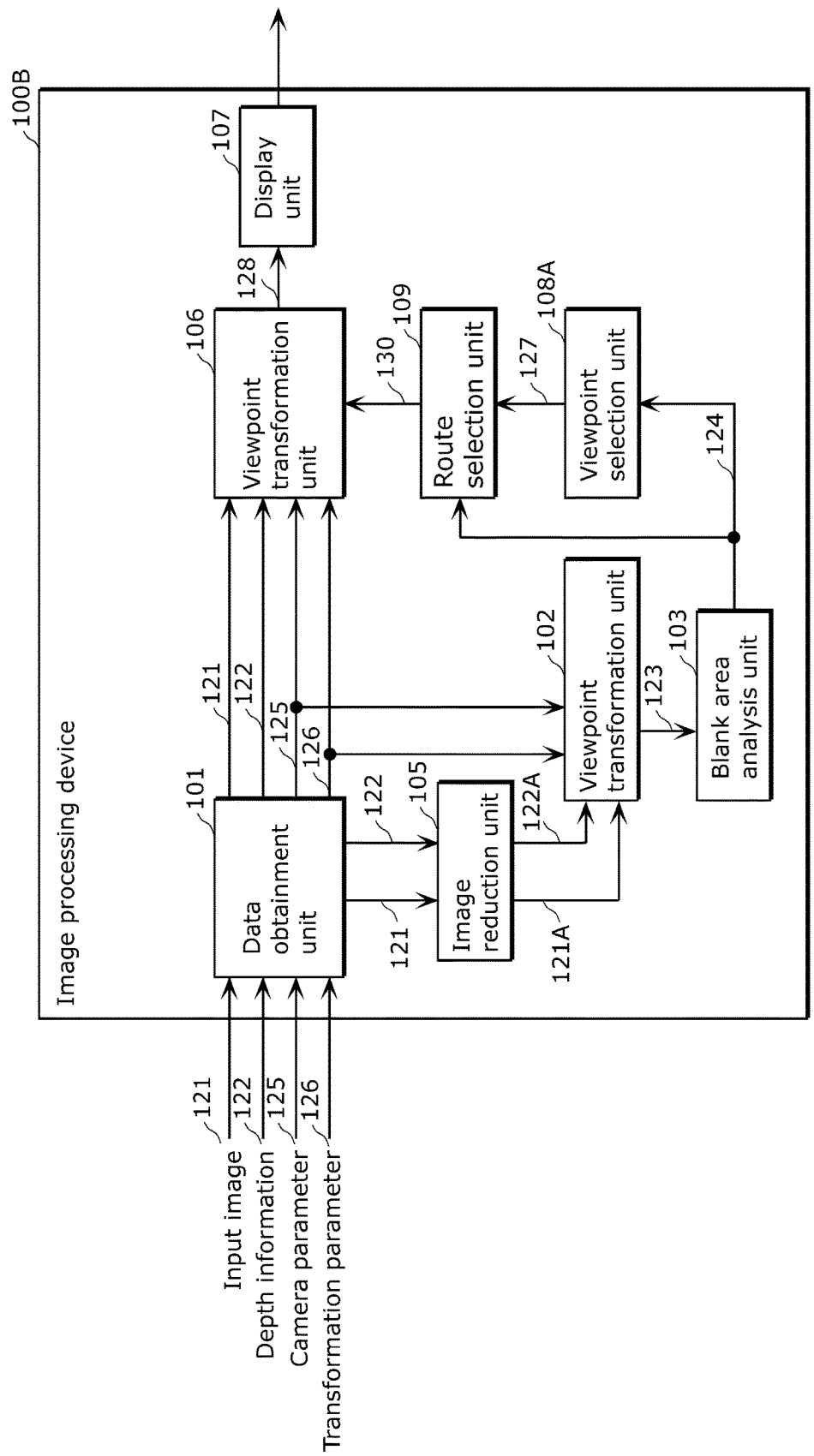
FIG. 14 is a block diagram of an image processing device according to Embodiment 3.

Compared with an image processing device 100A shown in FIG. 12, the image processing device 100B shown in FIG. 14 further includes a route selection unit 109. Note that, a configuration in which the image processing device 100A shown in FIG. 12 further includes the route selection unit 109 is described here. However, an image processing device 100 shown in FIG. 3 may further include the route selection unit 109.

The route selection unit 109 determines a route 130 for changing viewpoints by using a selection viewpoint 127 and the blank information 124. The route 130 is a route of viewpoint positions which are passed from the start of the viewpoint change to the end of the viewpoint change. More specifically, the route selection unit 109 determines, from among two or more of transformed images 123 corresponding to two or more of second viewpoints which are positioned between a first viewpoint and the selection viewpoint 127, one or more of the transformed images 123 having the blank areas of sizes smaller than or equal to a threshold by using the blank information 124. Then, the route selection unit 109 selects, as one or more intermediate viewpoint images, one or more transformed images 123 among the one or more of the transformed images 123. Then, when the selection viewpoint 127 is selected by the viewpoint selection unit 108A, the display unit 107 switches between and displays the input image 121, the intermediate viewpoint image, and a transformed image 128 corresponding to the selection viewpoint in this order to sequentially change a viewpoint of a displayed image from the first viewpoint to the selection viewpoint 127.

The following describes operations for determining the route, with reference to FIG. 15A to FIG. 15D.

Figure 15A:
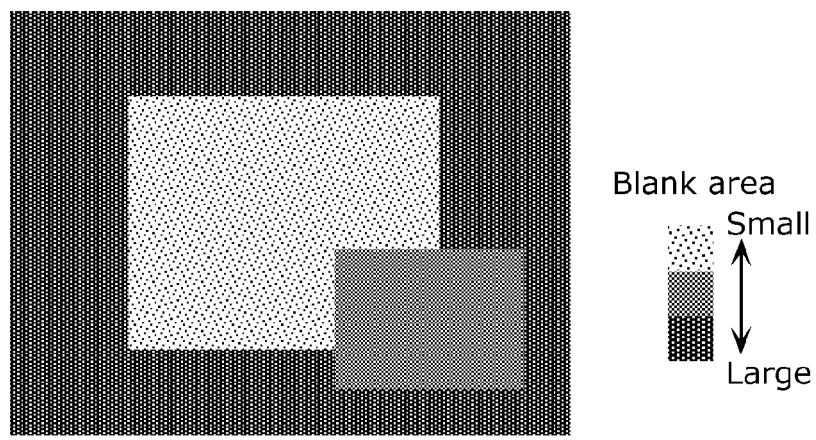
FIG. 15A is a diagram for describing a process for selecting a route according to Embodiment 3.
Figure 15B:
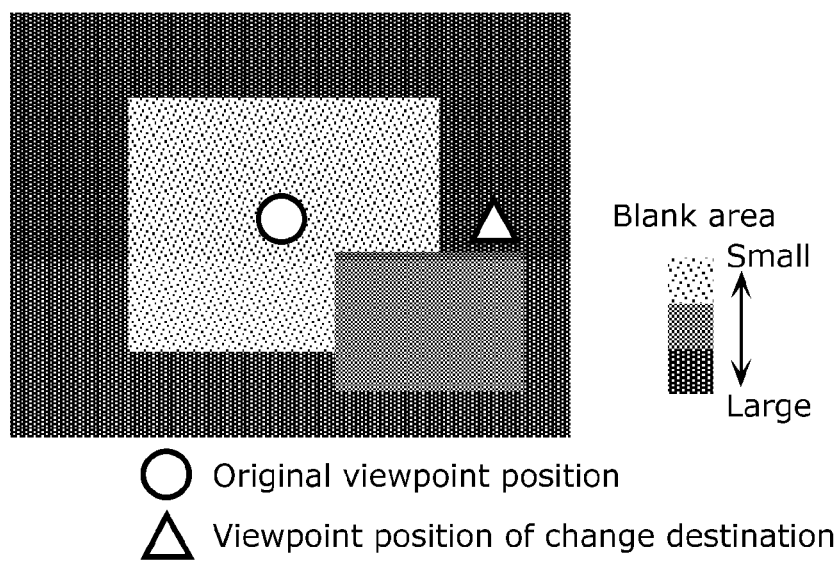
FIG. 15B is a diagram for describing the process for selecting a route according to Embodiment 3.

FIG. 15A is a diagram showing an example of the blank information 124. FIG. 15B is a diagram showing an example of an original viewpoint position and a viewpoint position of a change destination.

Figure 15C:
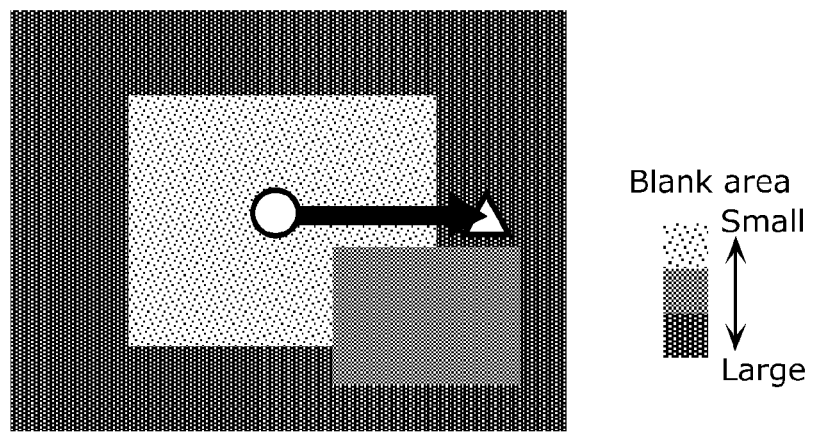
FIG. 15C is a diagram for describing the process for selecting a route according to Embodiment 3.
Figure 15D:
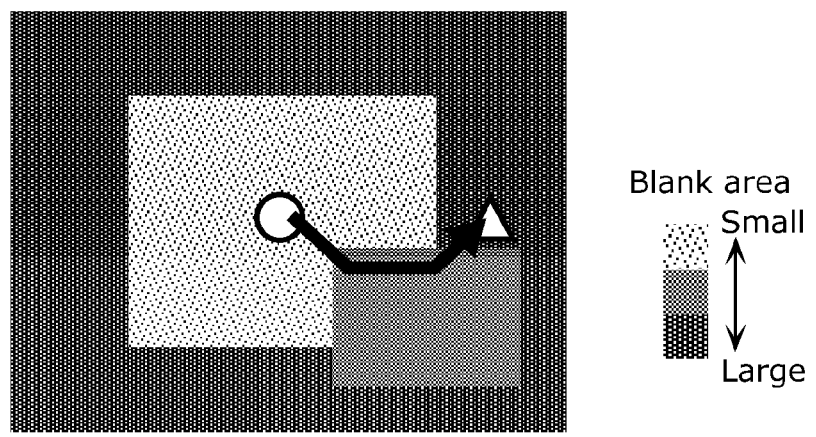
FIG. 15D is a diagram for describing the process for selecting a route according to Embodiment 3.

In this case, for example, a conceivable method for selecting the route is a method in which a route is selected that connects an original viewpoint position and a viewpoint position of a change destination in the shortest distance as shown in FIG. 15C. However, in the example shown in FIG. 15C, the route includes a viewpoint position in which a blank area is large. With this, the deterioration of the transformed image which is displayed is noticeable.

In this regard, in this embodiment, selection by the route selection unit 109 is not limited to such a shortest route, but the route selection unit 109 selects a route to avoid selection of the transformed image 128 having a low image quality by using the blank information 124. More specifically, the route selection unit 109 selects a route which passes through only viewpoint positions in which blank sizes are smaller than or equal to a predetermined threshold and has a shortest length. For example, in an example shown in FIG. 15D, a route is selected which only passes through viewpoint positions where blank sizes are "small" or "middle" and has a shortest length. Note that, the route selection unit 109 may select a route in which a sum or a product of a parameter based on a length of the route and a parameter based on the size of the blank area is smallest.

A viewpoint transformation unit 106 generates, using the route 130 for the viewpoint change which is determined as described above, the transformed images 128 which correspond to a plurality of viewpoint positions included in the route 130. Then, the display unit 107 sequentially displays the transformed images 128 to sequentially change the viewpoint positions from the original viewpoint position to the destination viewpoint position.

With the above, the image processing device 100B according to this embodiment can reduce chances of displaying an image having low quality when changing the viewpoint position.

The image processing devices according to embodiments of the present invention have thus far been described. However, the present invention is not limited to such embodiments.

Figure 16A:
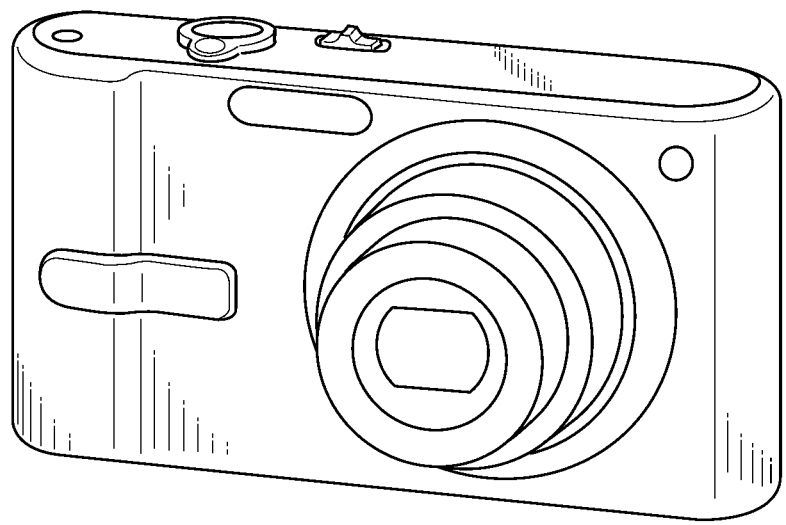
FIG. 16A is an external view showing an example of an image capturing device according to embodiments.
Figure 16B:
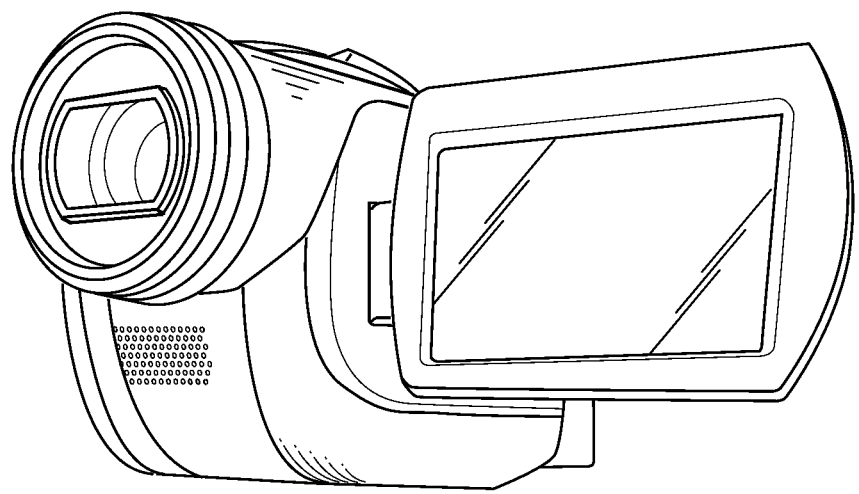
FIG. 16B is an external view showing an example of an image capturing device according to the embodiments.

Furthermore, each of the image processing devices according to the above-described embodiments is applied to, for example, a digital still camera shown in FIG. 16A, a digital video camera shown in FIG. 16B, or the like.

Furthermore, each of the processing units included in the image processing device according to each of the above-described embodiments is typically implemented as an LSI which is an integrated circuit. These processing units may be individually configured as single chips or may be configured so that a part or all of the processing units are included in a single chip.

Furthermore, the circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

Note that, the each of the structural elements in the above-described embodiments may be implemented as a piece of dedicated hardware or implemented by executing a software program appropriate for the structural element. The structural elements may be implemented by a program execution unit such as a CPU or a processor which reads and executes a software program recorded on a recording medium, such as a hard disk or a semiconductor memory.

Here, software which implements each of the image processing devices according to the above embodiments is a program described below.

In addition, the present invention may be realized as the aforementioned program or a non-transitory computer-readable recording medium on which the aforementioned program is recorded. Furthermore, it should be obvious that the program can also be distributed via a transmission medium, such as the Internet.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software.

Furthermore, the sequence in which the steps included in the above-described image processing method are executed is given as an example to describe the present invention in specific terms, and thus other sequences are possible. Furthermore, part of the above-described steps may be executed simultaneously (in parallel) with another step.

Although the image processing device according to one or more aspects of the present invention have thus far been described based on the embodiments, the present invention is not limited to these embodiments. Various modifications to the present embodiments that can be conceived by those skilled in the art and forms configured by combining structural elements in different embodiments without departing from the essence of the present invention may be included in the scope of one or more of the aspects of the present invention.

INDUSTRIAL APPLICABILITY

The present invention can be applied to an image processing device. Furthermore, the present invention can be applied to an image capturing device (a digital still camera or a video camera) or a portable terminal which is for general use or business use and includes an image processing device.

REFERENCE SIGNS LIST 100, 100A, 100B image processing device
101 Data obtainment unit
102, 106 Viewpoint transformation unit
103 Blank area analysis unit
104 Map generation unit
105 Image reduction unit
107 Display unit
108, 108A Viewpoint selection unit
109 Route selection unit
121, 121A Input image
122, 122A Depth information
123, 128 Transformed image
124 Blank information
125 Camera parameter
126 Transformation parameter
127 Selection viewpoint
129 Blank map

The invention claimed is:

1. An image processing device comprising:
   a data obtainment unit configured to obtain an input image captured from a first viewpoint, and depth information indicating a depth of a subject in the input image;
   a viewpoint transformation unit configured to generate, using the depth information, a plurality of first transformed images each of which is an image of the input image seen from a corresponding one of second viewpoints different from the first viewpoint;
   a blank area analysis unit configured to analyze a blank area which is included in each of the first transformed images and includes a pixel which does not have a corresponding pixel in the input image, and calculate, for each of the second viewpoints, a size of the blank area in the first transformed image corresponding to the second viewpoint;
   a display unit configured to display the input image;
   a viewpoint selection unit configured to select one of the second viewpoints as a selection viewpoint; and
   a route selection unit configured to select, from among two or more of the first transformed images corresponding to two or more of the second viewpoints which are positioned between the first viewpoint and the selection viewpoint, a first transformed image having the blank area of size smaller than or equal to a predetermined threshold as an intermediate viewpoint image by using the calculated sizes of the blank areas,
   wherein when the selection viewpoint is selected by the viewpoint selection unit, the display unit is configured to switch between and display the input image, the intermediate viewpoint image, and one of the first transformed images corresponding to the selection viewpoint in order to sequentially change a viewpoint of a displayed image from the first viewpoint to the selection viewpoint.

2. The image processing device according to claim 1, further comprising
   a map generation unit configured to associate each of the second viewpoints with a corresponding one of two-dimensional positions, and generate, using the sizes of the blank areas in the second viewpoints, a blank map which shows, for each of the two-dimensional positions, information regarding the size of the blank area in the second viewpoint associated with the two-dimensional position,
   wherein the display unit is configured to display the blank map.

3. The image processing device according to claim 2,
   wherein each of positions on the input image is associated with a corresponding one of the second viewpoints,
   the viewpoint selection unit is configured to select the selection viewpoint which is one of the second viewpoints which is associated with one of the positions on the input image, which is specified by a user,
   each of the two-dimensional positions is associated with a corresponding one of the positions on the input image, and
   the display unit is configured to display the blank map when displaying the input image.

4. The image processing device according to claim 3,
   wherein the map generation unit is configured to generate the blank map which shows, in association with each of the positions on the input image, a size of the blank area included in one of the first transformed images which corresponds to the second viewpoint associated with the associated position on the input image.

5. The image processing device according to claim 3,
   wherein the viewpoint transformation unit is further configured to generate, using the depth information, for each of the second viewpoints, a plurality of second transformed images each of which is an image of the input image seen from a corresponding one of third viewpoints each of which is at a position obtained by shifting, in a direction perpendicular to a plane of the input image, a corresponding one of the second viewpoints,
   the blank area analysis unit is further configured to determine whether or not a size of the blank area included in each of the second transformed images is smaller than or equal to a predetermined threshold, and
   the blank map shows, in association with each of the positions on the input image, a third viewpoint which has the blank area of a size smaller than or equal to the predetermined threshold, among the third viewpoints corresponding to the one of the second viewpoints which is associated with the associated position on the input image.

6. The image processing device according to claim 2,
   wherein the map generation unit is configured to:
   divide the second viewpoints into a plurality of groups each including different ones of the second viewpoints;
   associate each of the groups with a corresponding one of the two-dimensional positions;
   calculate, for each of the two-dimensional positions, a degree of a size of the blank area in the group associated with the two-dimensional position, using sizes of the blank areas in the second viewpoints included in the group, the sizes of the blank areas being indicated by the calculated sizes of the blank areas; and
   generate the blank map which shows, in association with each of the two-dimensional positions, a degree of a size of the blank area in the group associated with the associated two-dimensional position.

7. The image processing device according to claim 1,
   wherein the viewpoint selection unit is configured to (i) determine one or more of the first transformed images having the blank areas of sizes smaller than or equal to the predetermined threshold by using the calculated sizes of the blank areas, and (ii) select, as a selection image, one of the one or more of the first transformed images, and
   the display unit is configured to switch a displayed image from the input image to the selection image.

8. The image processing device according to claim 1,
   wherein the viewpoint transformation unit is configured to:
   generate a three-dimensional model of the subject in a camera coordinate system, using the input image, the depth information, and a camera parameter when the input image is captured; and
   generate the first transformed images by performing, on the three-dimensional model, projective transformations using transformation parameters each corresponding to a different one of the second viewpoints.

9. An image processing method comprising:
   obtaining an input image captured from a first viewpoint, and depth information indicating a depth of a subject in the input image;
   generating, using the depth information, a plurality of first transformed images each of which is an image of the input image seen from a corresponding one of second viewpoints different from the first viewpoint; and analyzing a blank area which is included in each of the first transformed images and includes a pixel which does not have a corresponding pixel in the input image, and calculating, for each of the second viewpoints, a size of the blank area in the first transformed image corresponding to the second viewpoint;

displaying the input image;

selecting one of the second viewpoints as a selection viewpoint; and selecting, from among two or more of the first transformed images corresponding to two or more of the second viewpoints which are positioned between the first viewpoint and the selection viewpoint, a first transformed image having the blank area of size smaller than or equal to a predetermined threshold as an intermediate viewpoint image by using the calculated sizes of the blank areas, wherein when the selection viewpoint is selected, the display unit switches between and displays the input image, the intermediate viewpoint image, and one of the first transformed images corresponding to the selection viewpoint in order to sequentially change a viewpoint of a displayed image from the first viewpoint to the selection viewpoint.

10. An integrated circuit comprising:

a data obtainment unit configured to obtain an input image captured from a first viewpoint, and depth information indicating a depth of a subject in the input image;

a viewpoint transformation unit configured to generate, using the depth information, a plurality of first transformed images each of which is an image of the input image seen from a corresponding one of second viewpoints different from the first viewpoint; and a blank area analysis unit configured to analyze a blank area which is included in each of the first transformed images and includes a pixel which does not have a corresponding pixel in the input image, and calculate, for each of the second viewpoints, a size of the blank area in the first transformed image corresponding to the second viewpoint;

a display unit configured to display the input image;

a viewpoint selection unit configured to select one of the second viewpoints as a selection viewpoint; and a route selection unit configured to select, from among two or more of the first transformed images corresponding to two or more of the second viewpoints which are positioned between the first viewpoint and the selection viewpoint, a first transformed image having the blank area of size smaller than or equal to a predetermined threshold as an intermediate viewpoint image by using the calculated sizes of the blank areas, wherein when the selection viewpoint is selected by the viewpoint selection unit, the display unit is configured to switch between and display the input image, the intermediate viewpoint image, and one of the first transformed images corresponding to the selection viewpoint in order to sequentially change a viewpoint of a displayed image from the first viewpoint to the selection viewpoint.

* * * * *